United States Patent
Yucek et al.

(10) Patent No.: US 8,489,024 B1
(45) Date of Patent: *Jul. 16, 2013

(54) DETERMINING CHAIN CONFIGURATION FOR A WIRELESS PROTOCOL IN A WIRELESS DEVICE SUPPORTING MULTIPLE WIRELESS PROTOCOLS

(75) Inventors: Tevfik Yucek, Sunnyvale, CA (US); Qinghai Gao, San Jose, CA (US); Sundar G. Sankaran, Campbell, CA (US); Susinder R. Gulasekaran, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 12/913,512

(22) Filed: Oct. 27, 2010

Related U.S. Application Data

(60) Provisional application No. 61/375,178, filed on Aug. 19, 2010.

(51) Int. Cl.
*B04B 7/00* (2006.01)
(52) U.S. Cl.
USPC .......................................... 455/41.2; 455/512
(58) Field of Classification Search
USPC ............... 455/73, 67.11, 82, 77, 422.1, 434, 455/458, 445, 552.1, 556.1, 557, 575.7, 553.1, 455/512, 41.2, 41.3; 370/311, 329, 338, 339
See application file for complete search history.

(56) References Cited

U.S. PATENT DOCUMENTS

| 7,505,790 | B2 | 3/2009 | Chang et al. |
| 7,525,502 | B2 | 4/2009 | Hui et al. |

(Continued)

FOREIGN PATENT DOCUMENTS

| WO | WO2004023746 A2 | 3/2004 |
| WO | WO2006060245 A2 | 6/2006 |
| WO | WO2009042469 A1 | 4/2009 |

OTHER PUBLICATIONS

U.S. Appl. No. 12/541,284, filed Aug. 14, 2009 Entitled: "Wireless Device Using a Shared Gain Stage for Simultaneous Reception of Multiple Protocols".

(Continued)

*Primary Examiner* — Nay A Maung
*Assistant Examiner* — Cindy Trandai
(74) *Attorney, Agent, or Firm* — Bay Area Technology Law Group

(57) ABSTRACT

Arbitration between two wireless protocols in a wireless device. The wireless device may include first wireless protocol circuitry, configured to receive and process first signals according to a first wireless protocol and second wireless protocol circuitry, configured to receive and process second signals according to a second wireless protocol. The wireless device may also include coexistence circuitry. The coexistence circuitry may be configured to receive a request from the first wireless protocol circuitry to perform transmission or reception and arbitrate the requested transmission or reception between the first wireless protocol circuitry and the second wireless protocol circuitry. The decision may be based on current or future priority information, current configuration, or other factors. The coexistence circuitry (or other circuitry) may be configured to determine position of switches controlling antennas or transmission using shared or unshared antennas (or chains). The two wireless protocols may be WLAN and Bluetooth.

18 Claims, 23 Drawing Sheets

U.S. PATENT DOCUMENTS

| | | | |
|---|---|---|---|
| 7,546,404 B2 * | 6/2009 | Yeh et al. | 710/117 |
| 7,568,050 B2 | 7/2009 | Karaoguz et al. | |
| 7,636,560 B2 | 12/2009 | Ku | |
| 7,643,811 B2 | 1/2010 | Reunamaki et al. | |
| 7,844,222 B2 | 11/2010 | Grushkevich | |
| 7,865,142 B2 | 1/2011 | Hansen et al. | |
| 2006/0160563 A1 * | 7/2006 | Ku | 455/552.1 |
| 2006/0292987 A1 | 12/2006 | Ophir et al. | |
| 2008/0139119 A1 * | 6/2008 | Behzad et al. | 455/41.2 |
| 2008/0161031 A1 | 7/2008 | Tu | |
| 2009/0310546 A1 | 12/2009 | Gopinath et al. | |
| 2012/0046000 A1 | 2/2012 | Gao et al. | |

OTHER PUBLICATIONS

U.S. Appl. No. 12/323,338, filed Nov. 25, 2008 Entitled: "Wireless Device Using a Shared Gain Stage for Simultaneous Reception of Multiple Protocols".

International Search Report and Written Opinion—PCT/US2011/048193—ISA/EPO—Nov. 21, 2011.

* cited by examiner

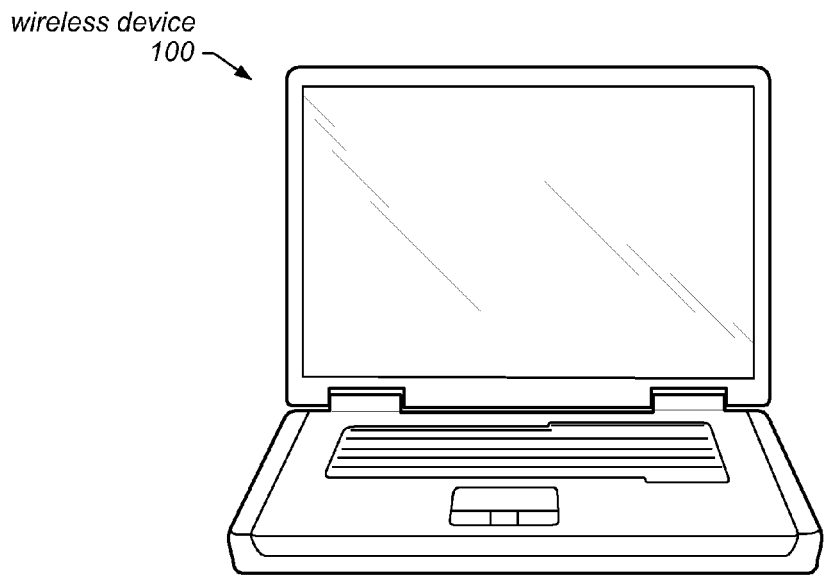
FIG. 1A
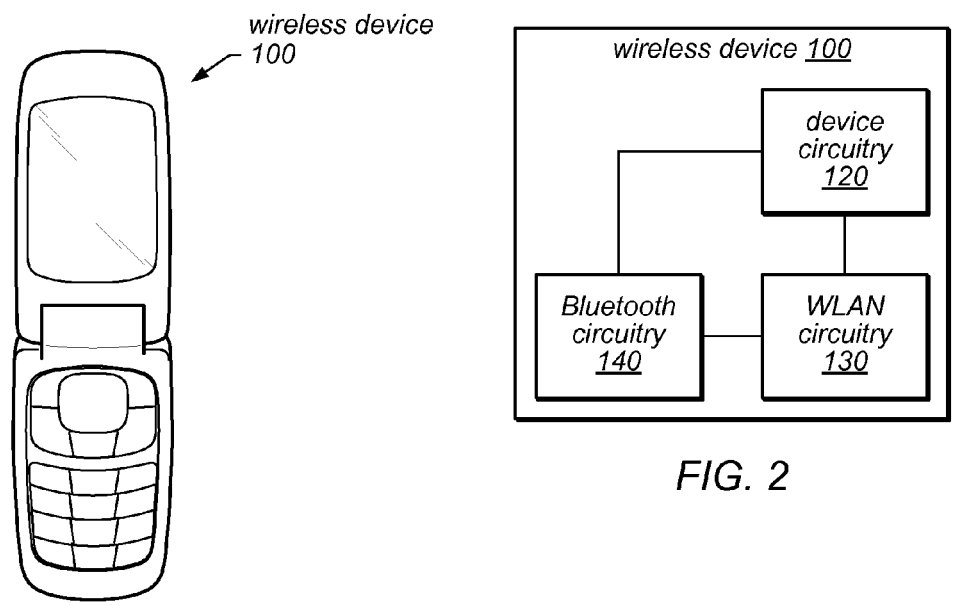
FIG. 1B
FIG. 2

BT WLAN combo architecture (internals)

| case | number of antennas | SPDT used | LNA shared | PA shared |
|---|---|---|---|---|
| 1 | 1 | no | yes | yes |
| 2 | 1 | yes | no | no |
| 3 | 1 | yes | yes | no |
| 4 | 1 | yes | no | yes |
| 5 | 1 | yes | yes | yes |
| 6 | 2 | no | yes | yes |
| 7 | 2 | yes | no | no |
| 8 | 2 | yes | yes | no |
| 9 | 2 | yes | no | yes |
| 10 | 2 | yes | yes | yes |
| 11 | 3 | no | no | no |

FIG. 6

| WLAN state | priority | configuration | outcome | (if with SPDT) the switch is parked at |
|---|---|---|---|---|
| search | BT | X | start BT Tx | if BT is allowed to start Tx, switch = btTxSwitchPos;<br><br>else, switch = X (no change); |
| | WLAN | X | delay BT Tx | |
| | equal | X | start BT Tx | |
| Tx | BT | X | abort WLAN Tx; start BT Tx | |
| | WLAN | X | delay BT Tx | |
| | equal | 1-ANT-PA not shared | delay BT Tx | |
| | | 1-ANT-PA shared | if Tx/Tx won't cause violation, start BT Tx;<br>else delay BT Tx | |
| | | 2-ANT-PA not shared | if WLAN Tx using one chain, start BT Tx;<br>else delay BT Tx | |
| | | 2-ANT-PA shared | if WLAN Tx using one chain, start BT Tx;<br>else if Tx/Tx won't cause violation, start BT Tx;<br>else delay BT Tx | |
| | | 3-ANT | start BT Tx | |
| Rx | BT | 1-ANT | start BT Tx; WLAN Rx through leakage | |
| | | 2-ANT | start BT Tx; WLAN Rx through de-weight | |
| | | 3-ANT | start BT Tx | |
| | WLAN | X | delay BT Tx | |
| | equal | 1-ANT | delay BT Tx | |
| | | 2-ANT | if WLAN Rxing single stream frame, start BT Tx and de-weight WLAN Rx;<br>else delay BT Tx | |
| | | 3-ANT | start BT Tx | |

FIG. 8

| current BT state | priority | configuration | outcome | (if with SPDT) the switch is parked at |
|---|---|---|---|---|
| idle | X | X | start WLAN Tx | WLAN |
| Tx | WLAN | X | abort BT Tx; start WLAN Tx | WLAN |
| | BT | X | delay WLAN Tx | |
| | equal | 1-ANT-PA not shared | delay WLAN Tx | btTxSwitchPos |
| | | 1-ANT-PA shared | if needed WLAN Tx power backoff is less than a threshold, start WLAN Tx with backed-off transmit power; else, delay WLAN Tx | |
| | | 2-ANT-PA not shared | consider dropping MCS to single stream rate and start WLAN Tx using one chain; else, delay WLAN Tx | |
| | | 2-ANT-PA shared | if needed WLAN Tx power backoff is less than a threshold, start WLAN Tx with backed-off transmit power; else, consider dropping MCS to single stream rate and start WLAN Tx using one chain; if neither of the above two works, delay WLAN Tx | |
| | | 3-ANT | start WLAN Tx | |
| Rx | WLAN | X | start WLAN Tx | WLAN |
| | BT/equal | X | delay WLAN Tx | btRxSwitchPos |

FIG. 10

| WLAN state | priority | configuration | outcome | (if with SPDT) the switch is parked at |
|---|---|---|---|---|
| Search | BT | X | Start BT Rx | btRxSwitchPos |
| | WLAN | X | Start BT Rx | X |
| | equal | X | Start BT Rx | btRxSwitchPos |
| Tx | BT | X | abort WLAN Tx; start BT Rx | btRxSwitchPos |
| | WLAN/ equal | 1-ANT | start BT Rx through leakage | WLAN |
| | | 2-ANT | if WLAN Tx using one chain, start BT Rx; else, start BT Rx through leakage | if WLAN Tx using one chain, switch = btRxSwitchPos; else, switch = WLAN; |
| | | 3-ANT | start BT Rx | N/A |
| Rx | BT | 1-ANT-LNA not shared | start BT Rx, WLAN continues Rx through leakage | btRxSwitchPos |
| | | 1-ANT-LNA shared | Rx/Rx | |
| | | 2-ANT-LNA not shared | Start BT Rx, WLAN continues Rx by de-weight | |
| | | 2-ANT-LNA shared | Rx/Rx | |
| | | 3-ANT | Rx/Rx | |
| | WLAN/ equal | 1-ANT-LNA not shared | start BT Rx | X |
| | | 1-ANT-LNA shared | Rx/Rx | X |
| | | 2-ANT-LNA not shared | if WLAN is Rxing a single stream frame, de-weight WLAN Rx and start BT Rx; else start BT Rx | if WLAN is Rxing a single stream frame, switch = btRxSwitchPos; else, switch = X; |
| | | 2-ANT-LNA shared | Rx/Rx | X |
| | | 3-ANT | start BT Rx | N/A |

FIG. 11

| Current BT state | priority | configuration | outcome | (if with SPDT) the switch is parked at |
|---|---|---|---|---|
| idle | X | X | WLAN continues Rx | X |
| Tx | WLAN | X | BT aborts Tx; WLAN continues Rx | X |
| | BT or equal | X | WLAN continues Rx | X |
| Rx | X | X | WLAN continues Rx | X |

*FIG. 12*

| BT event scheduled | priority | configuration | outcome | (if with SPDT) the switch is parked at |
|---|---|---|---|---|
| Tx | | WLAN | X | start WLAN Tx | WLAN |
| | | BT | X | if time_to_next_BT > thresh, start WLAN Tx; else delay WLAN Tx | if time_to_next_BT > thresh, start WLAN Tx; else delay WLAN Tx |
| | equal | 1-ANT-PA not shared | start WLAN Tx | WLAN |
| | | 1-ANT-PA shared | if needed WLAN Tx power backoff is less than a threshold, start WLAN Tx with backed-off transmit power; else start WLAN Tx with full power | WLAN |
| | | 2-ANT-PA not shared | consider dropping MCS to single stream rate and start WLAN Tx using one chain; else start WLAN Tx using two chains | if WLAN starts Tx using one-chain, switch = X; else, switch = WLAN |
| | | 2-ANT-PA shared | if needed WLAN Tx power backoff is less than a threshold, start WLAN Tx using two chains with backed-off transmit power on the shared chain; else, consider dropping MCS to single stream rate and start WLAN Tx using one chain; if neither works, start WLAN Tx using two chains with full power | if WLAN starts Tx using one-chain, switch = X; else, switch = WLAN |
| | | 3-ANT | start WLAN Tx | N/A |
| Rx | | WLAN | X | start WLAN Tx | WLAN |
| | | BT | X | if time_to_next_BT > thresh, start WLAN Tx; else delay WLAN Tx | if time_to_next_BT > thresh, switch = WLAN; else, switch = X |
| | equal | 1-ANT | start WLAN Tx | WLAN |
| | | 2-ANT | consider dropping MCS to single stream rate and start WLAN Tx using one chain; else start WLAN Tx using two chains | consider dropping MCS to single stream rate and start WLAN Tx using one chain; else start WLAN Tx using two chains |
| | | 3-ANT | start WLAN Tx | N/A |

FIG. 15

|  | PA shared | PA not shared | LNA shared | LNA not shared |
|---|---|---|---|---|
| btRxSwitchPos | WLAN side | BT side | - | - |
| btRxSwitchPos | - | - | WLAN side | BT side |

FIG. 19

DETERMINING CHAIN CONFIGURATION FOR A WIRELESS PROTOCOL IN A WIRELESS DEVICE SUPPORTING MULTIPLE WIRELESS PROTOCOLS

PRIORITY INFORMATION

This application claims benefit of priority of U.S. provisional Application Ser. No. 61/375,178 titled "Arbitration Between Multiple Wireless Protocols in a Wireless Device" filed Aug. 19, 2010, whose inventors were Qinghai Gao, Sundar G. Sankaran, Tevfik Yucek, and Susinder R. Gulasekaran, which is hereby incorporated by reference in its entirety as though fully and completely set forth herein.

BACKGROUND

1. Field of the Disclosure

The present invention relates generally to wireless communication, and more particularly to a system and method for arbitration between multiple wireless protocols in a system supporting multiple protocols for use in a wireless device.

2. Description of the Related Art

Wireless communication is being used for a plethora of applications, such as in laptops, cell phones, and other wireless communication devices ("wireless devices"). In fact, wireless communication is becoming so widely used, it is common for wireless devices to be able to communicate using a plurality of different wireless communication protocols. Accordingly, it is common for a wireless device to have different circuit portions that implement different wireless protocols.

However, when a wireless device implements multiple protocols, there may be difficulties in performing transmission and/or reception, especially when the two protocols share various hardware (e.g., gain elements, antennas, etc.). Therefore, improvements in wireless devices are desired.

SUMMARY OF THE DISCLOSURE

Various embodiments are described of a system (e.g., a wireless device or chip within a wireless device) and method for arbitrating between use of a first wireless protocol and a second wireless protocol.

In one embodiment, the system (e.g., for use in the wireless device) may include first wireless protocol circuitry. The first wireless protocol circuitry may be configured to receive and process first signals according to a first wireless protocol. The first wireless protocol circuitry may be configured to generate a request to perform a transmission or reception.

The system may similarly include second wireless protocol circuitry (e.g., on the same chip). The second wireless protocol circuitry may be configured to receive and process second signals according to a second wireless protocol. Similar to above, the second wireless protocol circuitry may be configured to generate a request to perform a transmission or reception.

The system may also include coexistence circuitry coupled to the first wireless protocol circuitry and the second wireless protocol circuitry. The coexistence circuitry is configured to receive a request from the first wireless protocol circuitry to perform transmission or reception. In various embodiments, the coexistence circuitry may be comprised in or external to the first and/or second wireless protocol circuitry.

The coexistence circuitry may also be configured to determine priority information for the first wireless protocol circuitry and the second wireless protocol circuitry in response to the request. For example, the priority information may indicate that the first wireless protocol circuitry has priority (e.g., for a current or expected packet reception or transmission according to the first wireless protocol), that the second wireless protocol circuitry has priority (e.g., for a current or expected packet reception or transmission according to the second wireless protocol), or that neither protocol has priority.

The coexistence circuitry may be configured to determine whether to allow the first wireless protocol circuitry to perform transmission or reception based on the priority information of the first wireless protocol circuitry, the priority information of the second wireless protocol circuitry, and/or current configuration information. The priority information may refer to priority of a current transmission or reception or priority of a future transmission or reception, as desired. Thus, the coexistence circuitry (or other circuitry) may also determine whether to allow the first wireless protocol circuitry to perform transmission or reception based on the priority information of scheduled or predicted activity of the second wireless protocol circuitry (e.g., rather than current priority information). Additionally, the current configuration information may include a number of antennas in use by the wireless device.

For example, if the first wireless protocol has a higher priority than the second wireless protocol, the coexistence circuitry may be configured to allow the first wireless protocol circuitry to perform the transmission. In another embodiment, if the first wireless protocol circuitry has an equal priority to the second wireless protocol circuitry, the coexistence circuitry may be configured to allow the first wireless protocol circuitry to perform the transmission or reception concurrently with a transmission or reception of the second wireless protocol circuitry.

If antenna switching is employed by the device, the coexistence circuitry (or other circuitry) may be configured to determine a position of a switch based on various factors. For example, the position of the switch may be determined based on the priority information of the first wireless protocol, the priority information of the second wireless protocol circuitry, and/or current configuration information. The switch may be configured to control access of the first wireless protocol circuitry and the second wireless protocol circuitry to one or more antennas.

The coexistence circuitry (or other circuitry) may also be configured to dynamically choose between using all (or shared) antennas or chains or only unshared antennas or chains. This embodiment may particularly apply to WLAN transmissions which may be capable of being downgraded from using shared antennas to only using unshared antennas.

In general, the first and second wireless protocols may be WLAN and Bluetooth, although other protocols are envisioned. Additionally, note that the determination of the first wireless protocol with respect to the second is for exemplary purposes only and may be inverted, as desired.

BRIEF DESCRIPTION OF THE DRAWINGS

A better understanding of the present invention can be obtained when the following Detailed Description of the Embodiments is read in conjunction with the following drawings, in which:

FIGS. 1A and 1B illustrates exemplary wireless devices, according to one embodiment;

FIG. 2 is a block diagram of an exemplary system supporting multiple wireless protocols for use in a wireless device according to one embodiment;

FIGS. 5A-6 are diagrams illustrating various antenna configurations of the wireless device, according to one embodiment;

FIGS. 8-12 illustrate embodiments of arbitration between two wireless protocols according to the method of FIG. 7;

FIGS. 14A-16 illustrate embodiments of arbitration between two wireless protocols based on scheduled activity of one of the wireless protocols;

FIGS. 18-20 illustrate embodiments of arbitration between two wireless protocols using one or more switches;

Figure 3:
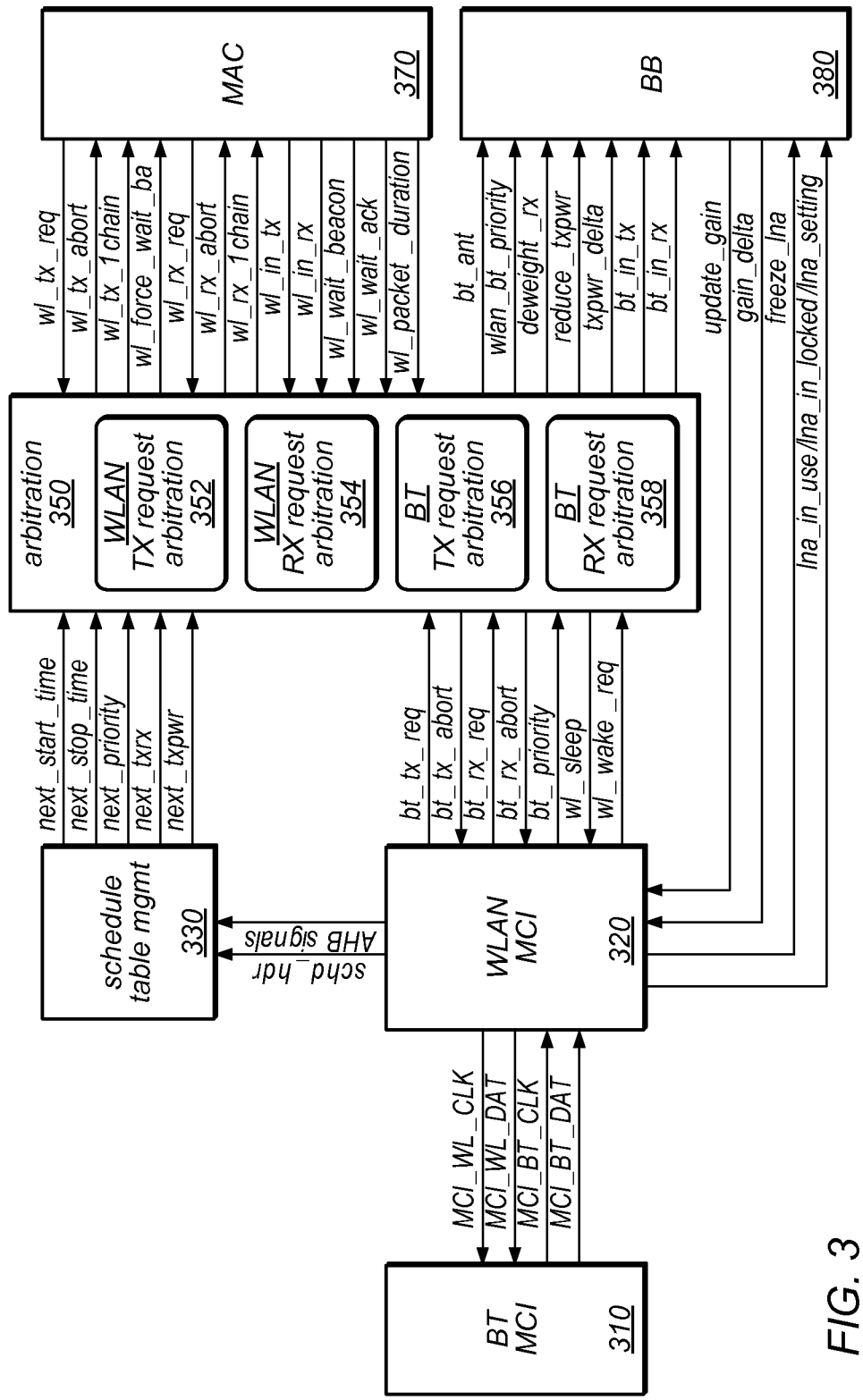
FIG. 3 is a diagram of an analog portion of a Bluetooth-WLAN implementation of a system supporting multiple wireless protocols for use in a wireless device according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE DISCLOSURE

Incorporation by Reference

The following applications are hereby incorporated by reference in their entirety as though fully and completely set forth herein:

U.S. application Ser. No. 12/541,284, titled "Wireless Device Using A Shared Gain Stage For Simultaneous Reception Of Multiple Protocols", filed Aug. 14, 2009, whose inventor is Paul J. Husted;

U.S. application Ser. No. 12/323,338, titled "Wireless Device Using A Shared Gain Stage For Simultaneous Reception Of Multiple Protocols", filed Nov. 25, 2008, whose inventors are Paul J. Husted, Srenik Mehta, and Soner Ozgur; and U.S. provisional application Ser. No. 61/116,239, titled "Wireless Device Using A Shared Gain Stage For Simultaneous Reception Of Multiple Protocols", filed Nov. 19, 2008, whose inventors are Paul J. Husted, Srenik Mehta, and Soner Ozgur.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIGS. 1A and 1B—Exemplary Wireless Device

FIGS. 1A and 1B illustrate an exemplary wireless device 100, according to one embodiment. As shown in FIG. 1A, the wireless device 100 may be a portable computer or other mobile computing device. Alternatively, as shown in FIG. 1B, the wireless device 100 may be a cell phone or smart phone or other similar mobile device (which may also be classified as a mobile computing device). However, it should be noted that other wireless devices are envisioned, such as personal digital assistants, multimedia players (portable or stationary), routers, and/or other mobile devices or computing systems which are operable to use wireless communication.

The wireless device 100 may be configured to perform wireless communication using a first wireless protocol and/or a second wireless protocol. For example, the wireless device 100 may be configured to perform wireless communication using only the first wireless protocol, using only the second wireless protocol, or simultaneously using both the first and second wireless protocol. The first and second wireless protocols may be any type of wireless protocol. In some embodiments, the first wireless protocol may be a wireless local area network (WLAN) protocol. Additionally, the second wireless protocol may be a short range wireless communication protocol, such as Bluetooth. As used herein, a short range wireless protocol may refer to wireless protocols which support distances of up to 1 meter to 10 meters, or in higher powered devices, 100 meters.

FIG. 2—Exemplary Block Diagram of the Wireless Device

As shown in FIG. 2, the wireless device 100 may include device circuitry 120 (for performing various functions of the wireless device), first wireless protocol circuitry (or logic) 130, and second wireless protocol circuitry (or logic) 140. The various logic or circuitry described herein may be may be implemented in any of various ways, such as analog logic, digital logic, a processor and memory (such as a CPU, DSP, microcontroller, etc.), an ASIC (application specific integrated circuit), an FPGA (field programmable gate array), or any combination of the above.

According to the various embodiments, the first and second wireless protocols may be any type of wireless protocol, albeit proprietary, well-known standard or less well-known standard, such as, without limitation, 802.11 (WLAN), Bluetooth, ZigBee, Wireless USB, RFID, Dedicated Short Range Communications (DSRC), any combination thereof, or any other wireless protocol, as desired. As shown, the first wireless protocol circuitry 202 and the second wireless protocol circuitry 204 may be able to communicate with each other, e.g., using a communication interface.

The wireless device 100 may have at least input (e.g., antenna(s)) for wirelessly receiving and/or transmitting signals. The first and second wireless protocol circuitries 130 and 140 may enable the wireless device 100 to transmit and/or receive wireless signals according to multiple wireless protocols. For example, the first wireless protocol circuitry 130 may enable reception, transmission, and processing of signals according to a first wireless protocol, and the second wireless protocol circuitry 140 may enable reception, transmission, and processing of signals according to a second wireless protocol. In one exemplary embodiment, the first wireless protocol circuitry 130 may be WLAN circuitry 130 and the second wireless protocol circuitry 140 may be Bluetooth circuitry 140. The WLAN circuitry 130 and the Bluetooth 140 circuitry may be co-located, e.g., may be located in the same wireless device 100.

The first wireless protocol circuitry 130 may be comprised on a first chip, and the second wireless protocol circuitry 140 may be comprised on a second chip. As used herein, the term "chip" has the full extent of its ordinary meaning, and includes an electronic device, e.g., a semiconductor device, that may be implemented in any of the ways described above for the first wireless protocol circuitry 130 and the second wireless protocol circuitry 140. In various embodiments, the circuitry 130 and 140 may be on different chips or on the same chip, as desired.

In one embodiment, the wireless device 100 may include various shared elements (e.g., a shared gain element) that may be used by both the first wireless protocol circuitry 130 and the second wireless protocol circuitry 140. The term "shared gain element" refers to a gain element (such as an amplifier, e.g., an LNA or PA, gain stage, etc.) that amplifies signals such that portions of the amplified signals are provided to either one of the first and second wireless protocol circuitry 130 and 140 (or 140, FIGS. 4 and 5), respectively. As described below, one or more antennas may also be shared by the first and second wireless protocol circuitry. The device 100 may include logic (e.g., in the device circuitry 120, the Bluetooth circuitry 140, the WLAN circuitry 130, or otherwise) for arbitrating reception and transmission between the first and second wireless protocol circuitry, e.g., based on current or future configuration information (e.g., priority, number of antennas, scheduled transmissions or receptions, predicted transmissions or receptions, etc.).

Additionally, the wireless device 100 (e.g., the device circuitry 120) may further include one or more memory mediums and processors for implementing various functionality. The wireless device 100 may operate as described herein.

FIG. 3—Block Diagram of a System Implementing Two Wireless Protocols

FIG. 3 illustrates a block diagram of an exemplary system that implements two wireless protocols. While the system of FIG. 3 is shown with the wireless protocols Bluetooth and WLAN, it may also be applicable to other wireless protocols, such as those listed above, among others. The system of FIG. 3 may be implemented as a portion or chip (e.g., a separate or distinct chip) that is included in the wireless device 100, e.g., for implementing the first and second protocols on the wireless device. The two wireless protocols may share various circuitry internal to the system of FIG. 3 (e.g., various amplifiers, such as PAs or LNAs) or hardware external to the system of FIG. 3 (e.g., antenna(s) of the wireless device 100.

Currently, Bluetooth and WLAN both operate in the same 2.4 GHz unlicensed band. Although BT's adaptive frequency hopping mitigates this problem, the front end may still be saturated. As a result, MAC level arbitration and scheduling functionality, as described herein, is beneficial. With both WLAN and BT on the same chip (or die), there are opportunities to make them both work more efficiently and achieve better coexistence.

As shown, the BT MCI 310 may provide MCI_BT_CLK (clock) and MCI_BT_DAT (data) to the WLAN MCI 320 and may receive the MCI_WL_CLK (clock) and MCI_WL_DAT (data) from the WLAN MCI 320.

The WLAN MCI 320 may provide schd_hdr and AHB signals to schedule table management block 330. The WLAN MCI 320 may also send lna_in_us/lna_in_locked/lna_setting and freeze_lna signals to the baseband 380. The WLAN MCI 320 may provide bt_tx_req, bt_rx_req, bt_priority, and wl_wak_req to the arbitration (or coexistence) block 350. The WLAN MCI 320 may receive bt_tx_abort, bt_rx_abort, and wl_sleep signals from the arbitration block 350.

Schedule table management block 330 may provide next_start_time, next_stop_time, next_priority, next_txrx, next_txpwr signals to arbitration block 350.

Arbitration block 350 may include WLAN tx request arbitration 352, WLAN rx request arbitration 354, BT tx request arbitration 356, and BT rx request arbitration 358. Arbitration block 350 may provide wl_tx_abort, wl_tx_1chain, wl_force_wait_ba, wl_rx_abort, wl_rx_1 chain signals to MAC 370 and may receive wl_tx_req, wl_rx_req, wl_in_tx, wl_in_rx, wl_wait_beacon, wl_wait_ack, and wl_packet_duration signals from MAC 370. Arbitration block 350 may provide bt_ant, wlan_bt_priority, deweight_rx, reduce_tx-pwr, txpwr_delta, bt_in_tx, and bt_in_rx signals to baseband 380.

Thus, in the embodiment, whenever one or more of the first or second wireless protocol circuitry (e.g., the BT or WLAN circuitry) needs to transmit or receive, it may send a request to the coexistence logic (e.g., circuitry, engine, etc.) 350. The request may indicate the priority of the request and/or other information. The coexistence circuitry may make a decision based on various factors, e.g., current and future activities (e.g., predicted or known future activities), as shown in FIG. 3. For example, in some instances (e.g., SCO BT profiles), the traffic may be predictable, and that information may also taken into account by the coexistence logic.

In some embodiments, using one or more shared PAs and/or shared LNAs, the two wireless protocols (e.g., WLAN and BT) can transmit and receive simultaneously. In one embodiment, the wireless protocols may be given same priority when concurrent transmissions are possible. Moreover, some platforms can only support one or two antennas. In that case, BT and WLAN may have to share one antenna. Further, switching between antennas, e.g., using an external switch, may be needed. The control of the external switch may also be determined by the coexistence logic. The arbitration logic 350 (or other logic) may also select the number of chains to use (e.g., shared or unshared chains). The coexistence logic in general, and with respect the SPDT control and chain control are described in more detail below. As used herein, "coexistence logic" or "coexistence circuitry" refers to logic or circuitry that enables a wireless device to use multiple communication protocols.

Note that while the above example (and other examples herein) utilizes Bluetooth and WLAN as the two wireless protocols, they may be replaced with any two appropriate wireless protocols, as desired.

Figure 4A:
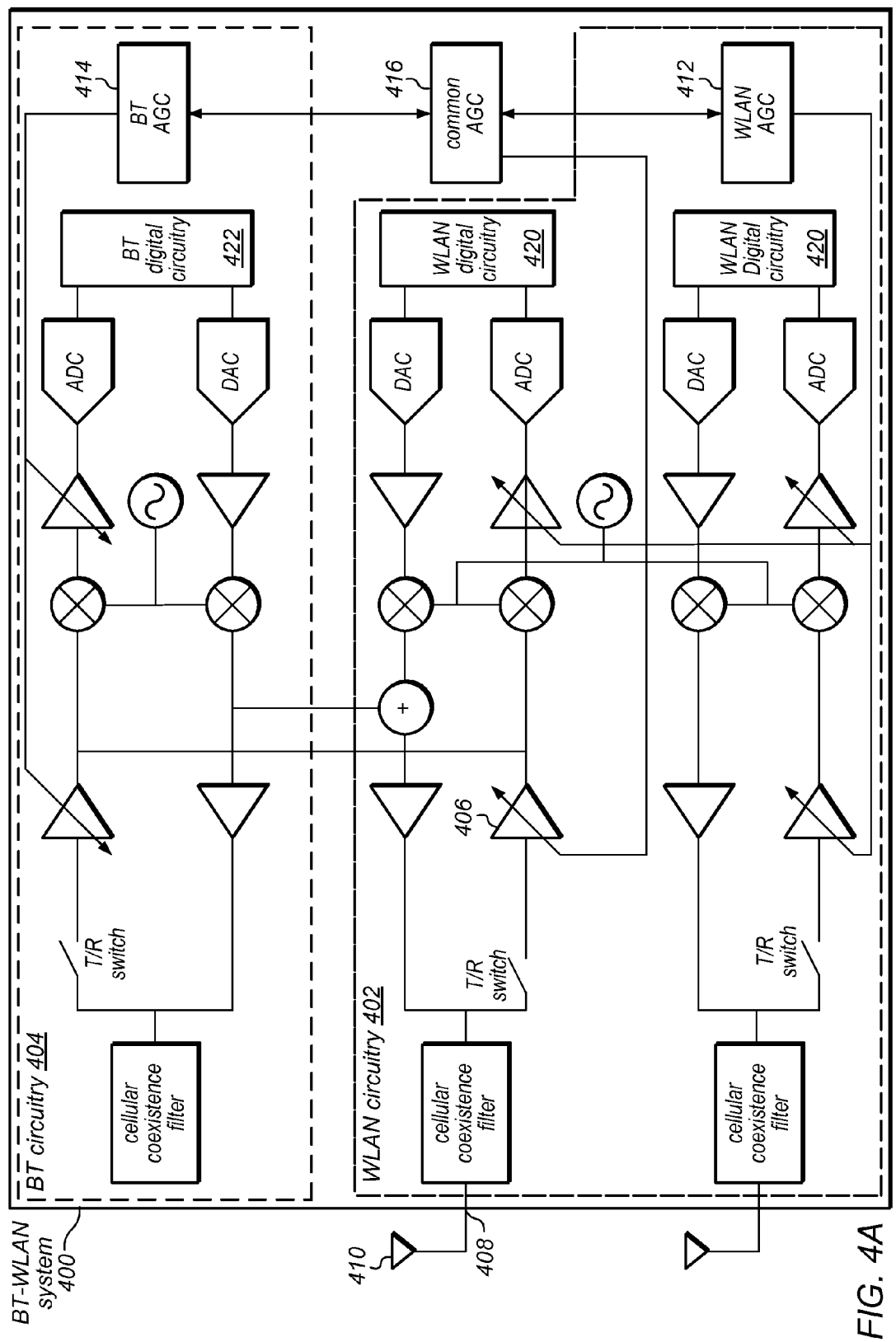
FIGS. 4A and 4B are block diagrams illustrating embodiments of a Bluetooth-WLAN implementation of a system supporting multiple wireless protocols for use in a wireless device according to one embodiment.
Figure 4B:
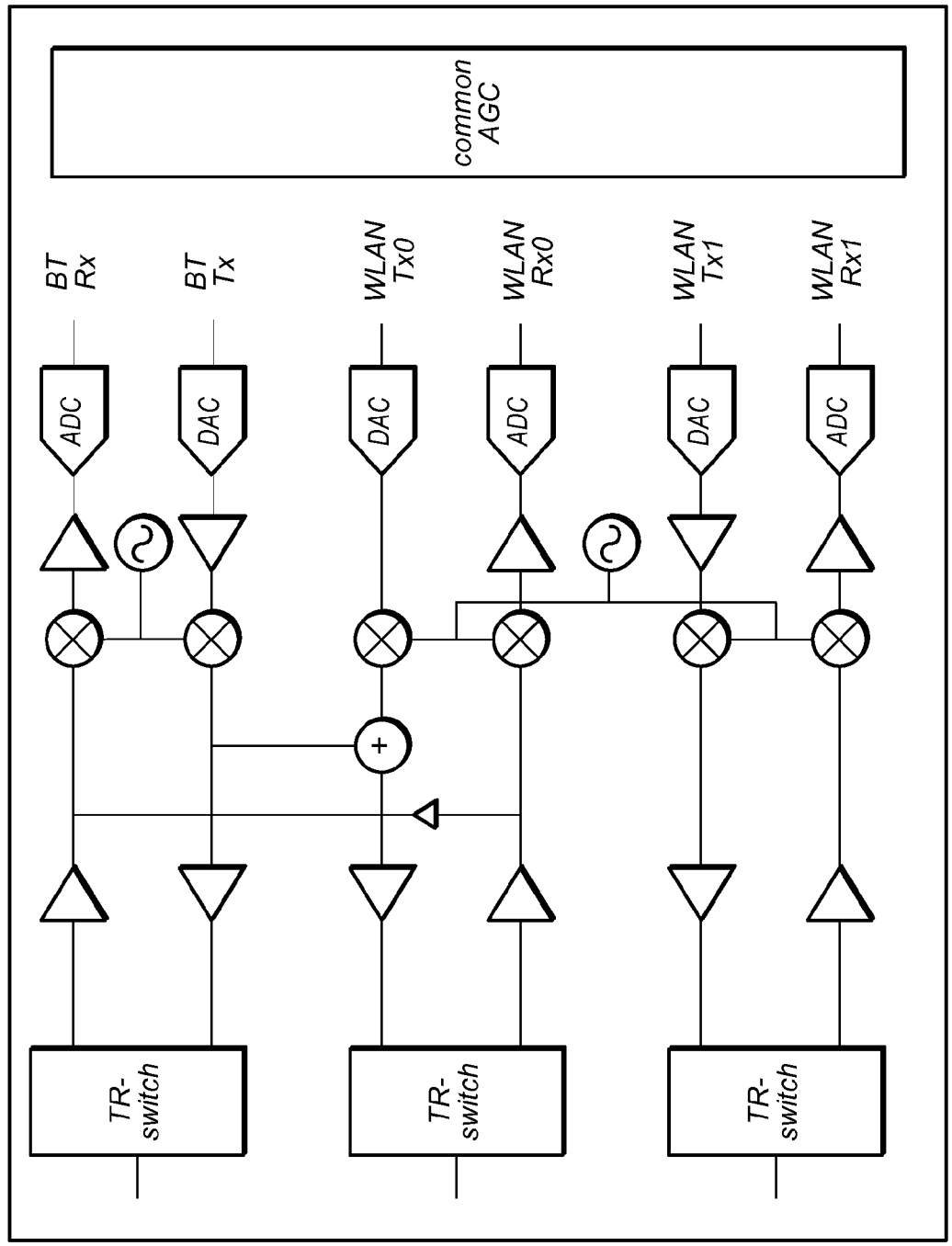

FIGS. 4A and 4B—Exemplary Wireless Protocol Circuit Block Diagram

FIGS. 4A and 4B illustrate embodiments an analog portion of a Bluetooth-WLAN implementation of a system 400 supporting multiple wireless protocols for use in the wireless device 100. As noted above, this exemplary embodiment is illustrative of one possible implementation of this disclosure, and is not intended to be limiting to the disclosure as a whole. Implementations directed to different wireless protocols are envisioned, as are implementations directed to different system architectures. Further description and examples of possible system architectures implementing a common gain element are provided in U.S. application Ser. No. 12/541,284 and U.S. application Ser. No. 12/323,338, which are incorporated by reference above. Numerous other possible variations and modifications will be apparent to those of skill in the art having the benefit of this disclosure, and should be considered within the scope of this disclosure.

As shown in FIG. 4A, the system 400 may include a coupling 408 for receiving/sending signals (e.g., from/to an antenna such as antenna 410). When signals are being received, the signals may be passed to the common gain element 406. As shown, the common gain element 406 may be a low noise amplifier (LNA). The gain setting of the LNA 406 may be controlled by the common automatic gain control (AGC) logic 416, which may be controlled by either the Bluetooth (BT) AGC 414 or the WLAN AGC 412 depending on the circumstances. The mechanism for determining whether the Bluetooth AGC 414 or the WLAN AGC 412 controls the gain setting of the common gain element 406 may be any of a variety of mechanism. The LNA 406 may amplify the received signals according to its gain setting, after which the signals may be split out to the Bluetooth circuitry 404 and the WLAN circuitry 402. It should be noted that while the LNA 406 is shown as being located within the WLAN circuitry 402, it may in some embodiments be physically located in closer proximity to the WLAN circuitry 402 than to the Bluetooth circuitry 404, LNA 406 may logically be common to both the Bluetooth circuitry 404 and the WLAN circuitry 402.

After being out split to the Bluetooth circuitry 404 and the WLAN circuitry 402, the received signals may be processed by the respective circuitries. This may include one or more analog processing steps by various analog components of the respective circuitries 402, 404, such as downconversion to a baseband signal (e.g., using oscillators and mixers, as shown) and/or further gain control (e.g., using one or more amplifiers, as shown, to account for differences in strength between Bluetooth components of received signals and WLAN components of received signals). Various alternative or additional analog components and/or analog processing steps are also contemplated. Following any such analog processing, the received signals may be converted to digital signals by each circuitry's respective analog-to-digital converter and passed to digital portions 420, 422 of the respective circuitries 402, 404 for processing according to the respective protocols.

It should be noted that in some embodiments, one or both of the wireless protocol circuitries may include multiple receive/transmit paths. For example, as shown, the WLAN might have multiple receive/transmit paths corresponding to different bandwidths on which the WLAN can operate. Thus, the WLAN circuitry might include one transmit/receive path for the 2.4 GHz range, and one transmit/receive path for the 5 GHz range. In this case, the common gain element 406 may be common to the 2.4 GHZ path of the WLAN and to the Bluetooth (which may also operate at 2.4 GHz), while the 5 GHz path of the WLAN may not share any elements with the Bluetooth path. As another example, the WLAN may include multiple transmit/receive paths operating in the same frequency band (to support MIMO). In this case, only one chain may share the LNA 406, and the other chain(s) may not share the LNA 406. Additionally, a plurality of chains (e.g., 2, 3, 4, etc.) are envisioned.

FIG. 4B illustrates a more generic block diagram of the analog portion of FIG. 4A and may operate in a similar fashion. In some embodiments, the analog front-end shown in FIGS. 4A and 4B may be used with any of various system architectures described herein.

FIGS. 5A-5E and 6—Various Antenna Configurations

FIGS. 5A-5E illustrate various antenna configurations that may be used by the wireless device 100. For example, the combo chip 500 may implement any of various protocols (e.g., WLAN and Bluetooth) and may be implemented via the systems of FIGS. 3 and 4 (among other possibilities or variations thereon). In one embodiment, the combo chip 500 may be configured to operate with any of the antenna configurations shown (e.g., without modification or with only a configuration change), among other possibilities. Thus, the combo chip 500 may support wireless devices with varying numbers of antennas, e.g., according to the wireless device manufacturer's needs.

Figure 5A:
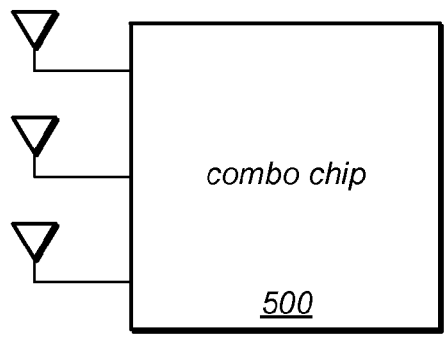

As shown in FIG. 5A, the combo chip 500 may operate with three antennas. Each antenna may be coupled to each portion of the combo chip (e.g., the BT portion, the first WLAN portion, and the second WLAN portion of FIGS. 4A and 4B).

Figure 5B:
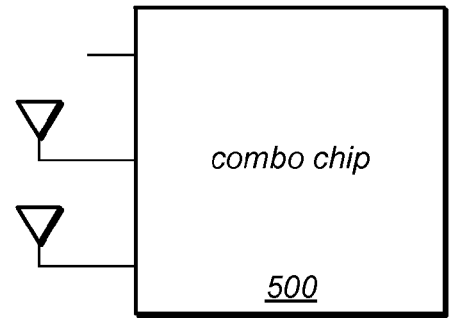

As shown in FIG. 5B, the combo chip 500 may operate with two antennas. In this embodiment, the two antennas may be coupled to two different portions of the combo chip 500

(e.g., the WLAN portions, although signals of the first WLAN portion may also be shared by the BT portion if they are coupled in the manner of FIG. 4A or 4B.

Figure 5C:
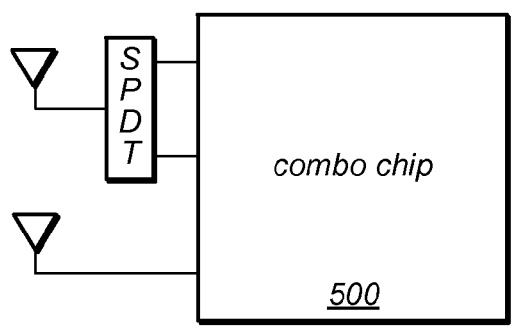

As shown in FIG. 5C, the combo chip 500 may operate with two antennas, but one of the antennas may be shared among circuitry (e.g., the Bluetooth and WLAN circuitry of FIG. 4) utilizing a switch (e.g., an SPDT (single pole, double throw) switch). The configuration of the switch may be altered according to various logic and based on reception and transmission configurations, as described below.

Figure 5D:
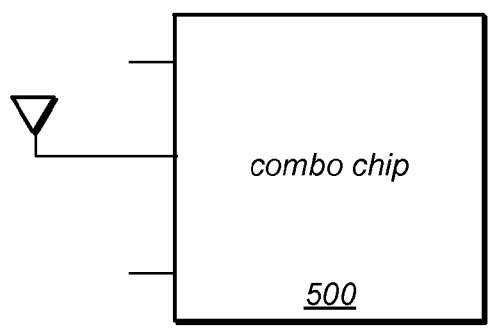

As shown in FIG. 5D, the combo chip 500 may operate with one antenna.

Figure 5E:
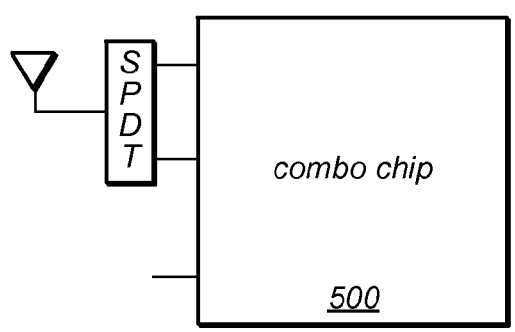

As shown in FIG. 5E, the combo chip 500 may operate with one antenna, shared between two circuit portions via a switch (e.g., an SPDT switch).

FIG. 6 illustrates an exemplary table of configurations. As shown, in one particular embodiment, there are 11 different configurations which may be used:

Five configurations may be used for a single antenna (varying use of SPDT, sharing of LNA, and sharing of PA). More particularly, in the single antenna case, if a switch is not used, the LNA and PA may be shared. In case 2, a switch is used and the amplifiers are not shared. In case 3, a switch is used, the LNA is shared, and the PA is not shared. In case 4, a switch is used, the LNA is not shared, and the PA is shared. In case 5, a switch is used and the LNA and PA are both shared.

Five configurations may be used for two antennas (varying use of SPDT, sharing of LNA, and sharing of PA). More particularly, in case 6, a switch is not used and the LNA and PA are shared. In case 7, a switch is used and the amplifiers are not shared. In case 8, a switch is used, the LNA is shared, and the PA is not shared. In case 9, a switch is used, the LNA is not shared, and the PA is shared. In case 10, a switch is used and the LNA and PA are both shared.

Finally, there is one configuration for three antennas, where no switch is used and the amplifiers are not shared (since each path has its own transmit/receive antenna, sharing and switching is not necessary). Further configurations are envisioned, e.g., for variations in the diagrams of FIGS. 4A-5E (e.g., with more or less pathways, different antenna configurations, etc.). Note that in configurations above, when the PA and/or LNA is shared, the system may be capable of transmitting and receiving simultaneously (e.g., using the same chain or antenna).

Figure 7:
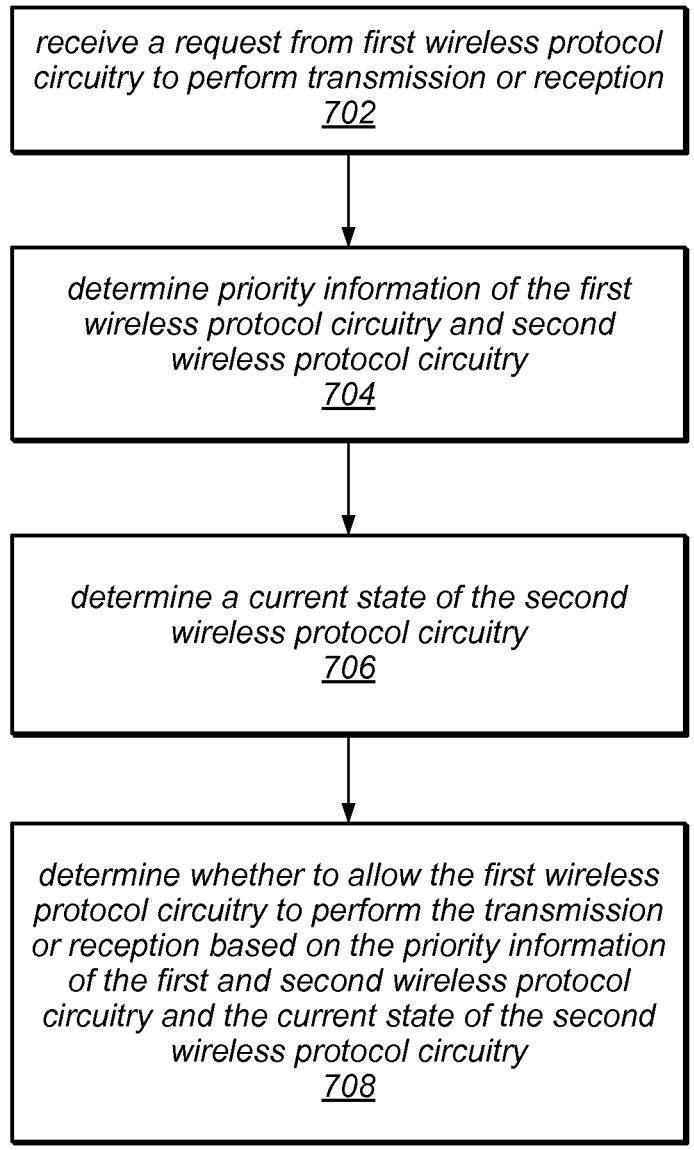
FIG. 7 is a flowchart diagram illustrating one embodiment of a method for arbitration between a first wireless protocol and a second wireless protocol based on priority information.

FIG. 7—Arbitrating Between Wireless Protocols Using Current Priority Information FIG. 7 is a flowchart diagram illustrating one embodiment of a method for arbitrating between two wireless protocols based on current priority information. The method may be implemented in a system supporting multiple wireless protocols for use in a wireless device, such as any of the systems shown in the various figures and described with respect thereto. In some embodiments (such as might be implemented in the systems shown above and described above with respect thereto), the wireless protocols may be WLAN and Bluetooth (BT). The wireless protocols may alternatively be other wireless protocols, if desired. The method elements may be modified, performed in a different order, removed, etc., as desired.

In 702, a request may be received from first wireless protocol circuitry to perform a transmission or reception. In one embodiment, the request may be received by coexistence logic or circuitry, such as the arbitration logic 350; however, the coexistence logic may be separate from or integrated with the first wireless protocol circuitry or second wireless protocol circuitry.

In 704, current priority information of the first wireless protocol circuitry and the second wireless protocol circuitry may be determined. In one embodiment, the priority information may be determined by coexistence logic or by other logic, as desired. For example, the priority information may involve determining whether concurrent transmission is possible (e.g., if so, resulting in equal priority). The priority information may be assigned according to descriptions described in the patent applications incorporated by reference above.

The priority information may indicate whether the first wireless protocol circuitry should get priority for the requested transmission or reception or if the second wireless protocol circuitry should get priority for its own transmission or reception. In some embodiments, when the priority information indicates equal priority between the first wireless protocol circuitry and the second wireless protocol circuitry, the two wireless protocol circuitries may be able to perform transmission and reception concurrently. In general, the priority information associated with each protocol circuitry may be for the circuitry in general or for specific transmissions or receptions, as desired.

In 706, a current state of the second wireless protocol circuitry may be determined. For example, the current state may be "idle" or "searching" (where it is not in an active transmission or reception), transmission, or reception, although other states may be possible.

In 708, the method may determine whether to allow the first wireless protocol circuitry to perform the transmission or reception based on the priority information of the first and second wireless protocol circuitry and the current state of the second wireless protocol circuitry. For example, if the first wireless protocol circuitry has a higher priority (or simply priority over) the second wireless protocol circuitry, then the method (e.g., the coexistence circuitry) may allow the first wireless protocol circuitry to perform the transmission or reception. Conversely, if the second wireless protocol circuitry has higher priority than the first wireless protocol circuitry, then the method may not allow (e.g., may delay) the first wireless protocol circuitry to perform the transmission or reception. If the two wireless protocol circuitries have equal priority, then the first wireless protocol circuitry may be allowed to perform the transmission or reception (e.g., concurrently with transmission or reception of the second wireless protocol circuitry).

As indicated, the determination of whether to allow the requested transmission or reception may also be based on the state of the second wireless protocol circuitry. For example, if the current state of the second wireless protocol circuitry is "idle" or "searching", then the first wireless protocol circuitry may be allowed to perform the transmission or reception regardless of priority. However, where the state is "transmission" or "reception", the priority information may be used to determine whether to allow the transmission or reception, as indicated above. Note that the outcome of the decision may be different depending on whether the request is a transmission request or a reception request, and whether the current state is "transmission" or "reception". Further, it should be noted that the assignment of priority may be based on the particular request (e.g., transmission or reception) and the state of the second wireless protocol, although, in other embodiments, this may not be the case.

The determination of whether to allow the requested transmission or reception may be based on further information, such as configuration information. For example, the configuration information may relate to the number of antennas that are available for use by the first and second wireless protocol circuitry (e.g., as shown in FIGS. 5A-5E and FIG. 6). For example, if there is an antenna for each wireless protocol circuitry, the requested transmission or reception may be allowed regardless of state and/or priority information (although in some embodiments, the priority information may still matter for proper transmission or reception). However, where the two wireless protocol circuitries share a common antenna, the choice may be determined as described above. The configuration information may also indicate whether the two wireless protocols share a gain element (e.g., an LNA and/or a PA), and the determination may be based on whether the gain element(s) are shared. The determination may also depend on whether shared or unshared antennas (or chains) are used by either the requested transmission or reception or a transmission or reception by the second wireless circuitry.

Additionally, as described with regard to FIGS. 13-16, the determination of whether to allow the requested transmission or reception may also be based on future transmission or receptions of the second wireless protocol circuitry. The method may also determine whether to use shared or unshared antennas or chains to perform a transmission or reception as well as switch positions for antennas, as described in FIGS. 17-22.

Finally, more details on one embodiment for the determination of whether to allow the requested transmission or reception is provided with respect to FIGS. 8-12 below.

FIGS. 8-12—Exemplary Arbitration Using Current Priority Information

FIGS. 8-12 illustrate specific embodiments of the arbitration between two wireless protocols of FIG. 7. More particularly, in these embodiments, the arbitration is also performed according to the current configuration of the wireless device (such as those described above). Similar to above, the following section is described with respect to Bluetooth and WLAN, but may be modified to be any two wireless protocols (e.g., including the inverse where WLAN is replaced with Bluetooth).

More particularly, FIG. 8 illustrates one embodiment of arbitration when Bluetooth is transmitting or will transmit. More particularly, when BT wants to transmit, it may send a request to the coexistence engine. The coexistence logic may handle the request according to the table of FIG. 8. As shown in the table:

WLAN Tx (transmission) may be aborted if high priority BT Tx happens;

BT starts transmit if BT has higher priority than WLAN;

BT may not transmit if BT has lower priority than WLAN;

If equal priority, BT may tx (e.g., simultaneously if the FCC limit is not violated);

With equal priority, if WLAN is receiving single stream frame in the 2-antenna case, BT may start transmission and WLAN may de-weight.

Note that "X" indicates any priority or configuration.

Figure 9:
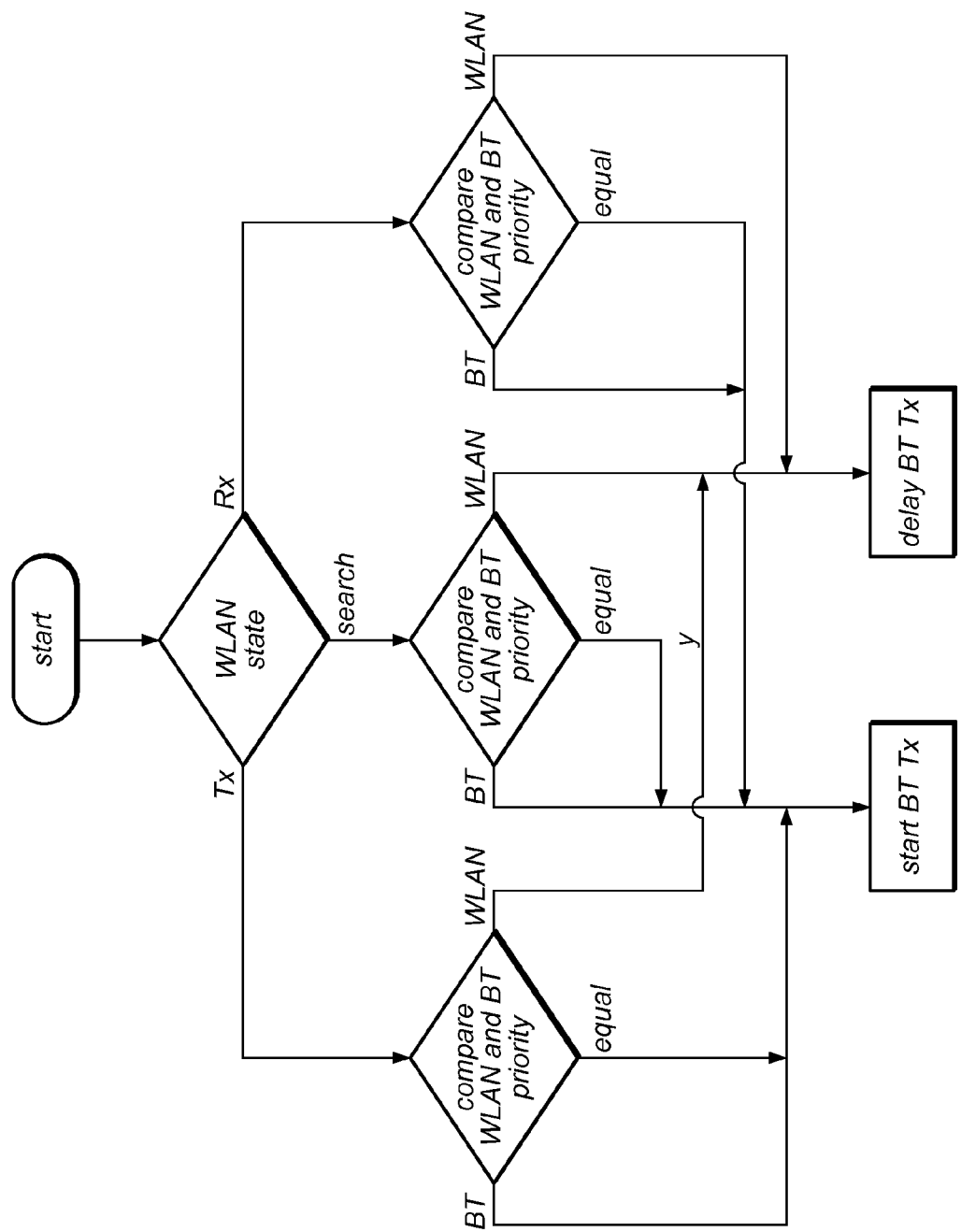

FIG. 9 is an exemplary flow chart for Bluetooth transmission in a 3 antenna case. As shown, if the WLAN state is Tx, then the WLAN and BT priority may be compared. If BT priority is greater or equal to WLAN, then BT Tx may occur. Otherwise, BT Tx may be delayed. The decision is similarly made for WLAN state "Search" and "Rx".

FIG. 10 illustrates one embodiment of arbitration for a BT transmission request when WLAN is or will transmit (e.g., for a 3 antenna configuration). As shown, if BT has priority or is equal to WLAN priority, the BT transmission may begin, otherwise the BT transmission may be delayed.

FIG. 11 illustrates one embodiment of arbitration when BT is or will receive. More particularly, as shown in the table:

When high priority BT reception starts, WLAN may abort transmission;

With equal priority, if WLAN is transmitting, may do wlan_Tx/bt_Rx simultaneously;

For Rx/Rx with equal priority, if WLAN is receiving single-stream rate frame, BT may start receiving and WLAN will do de-weight.

Finally, FIG. 12 illustrates one embodiment of arbitration when WLAN is or will receive. More particularly, as shown in the table:

Only WLAN Ack and Beacon receive may be predicted;

BT tx may be aborted if high-priority WLAN Rx starts.

Note that the tables of FIGS. 8, 10, 11, and 12 include SPDT switch positions. The positions may apply to the embodiments of FIGS. 17-20.

Figure 13:
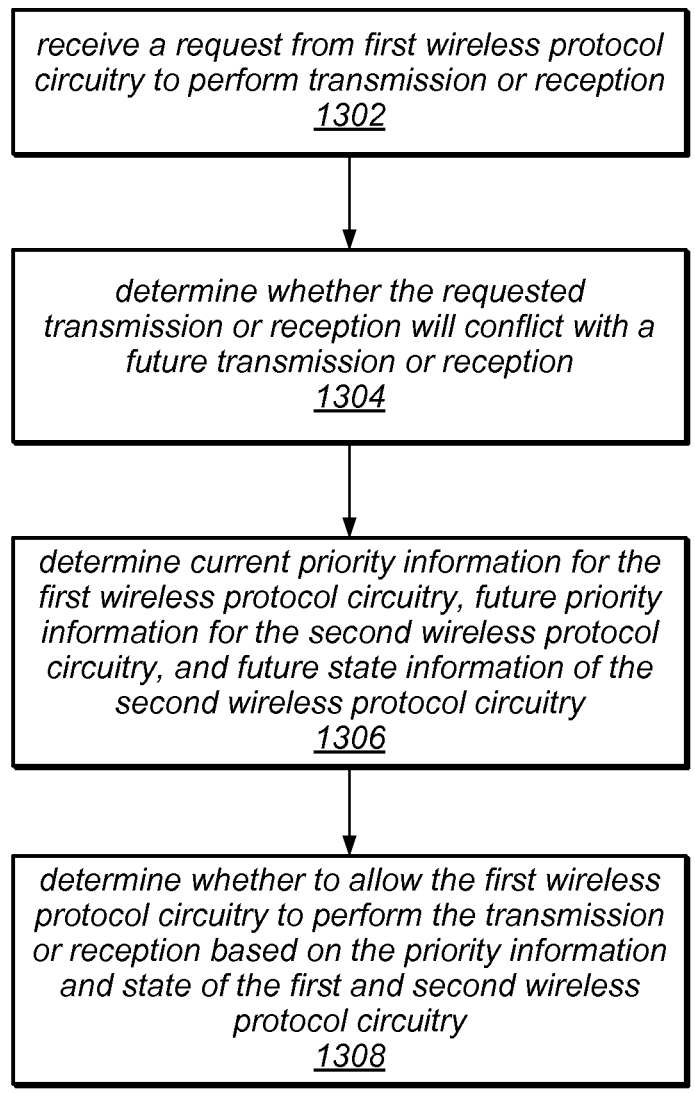
FIG. 13 is a flowchart diagram illustrating one embodiment of a method for arbitration between a first wireless protocol and a second wireless protocol based on future transmissions or receptions.

FIG. 13—Arbitrating Between Wireless Protocols Using Future Information

FIG. 13 is a flowchart diagram illustrating one embodiment of a method for arbitrating between two wireless protocols based on future information. The method may be implemented in a system supporting multiple wireless protocols for use in a wireless device, such as any of the systems shown in the various figures and described with respect thereto. In some embodiments (such as might be implemented in the systems shown above and described above with respect thereto), the wireless protocols may be WLAN and Bluetooth (BT). The wireless protocols may alternatively be other wireless protocols, if desired. The method elements may be modified, performed in a different order, removed, etc., as desired.

In 1302, similar to 702 above, a request may be received from the first wireless protocol circuitry to perform a transmission or reception.

In 1304, the method may determine whether the requested transmission or reception will conflict with a future transmission or reception. For example, in one embodiment, the method may compare the difference between the current time (or time for the requested transmission or reception) with the scheduled time for the future transmission or reception with a threshold time. If the difference is above the threshold, there may not be a conflict; however, if the difference is below the threshold, there will be a conflict, and a decision may need to be made regarding the requested transmission or reception with respect to the future transmission or reception.

The future transmission or reception by the second wireless protocol circuitry may be any known or predicted transmission or reception. For example, there may be a table storing scheduled transmission or receptions for the second wireless protocol circuitries (such as scheduled Bluetooth transmissions, e.g., for SCO, or expected WLAN receptions, e.g., an ack).

In 1306, if there will be a conflict, current priority information for the first wireless protocol circuitry, future priority information for the second wireless protocol circuitry, and future state information of the second wireless protocol circuitry may be determined.

In 1308, the method may determine whether to allow the first wireless protocol circuitry to perform the transmission or reception based on the priority information and state of the first and second wireless protocol circuitry. 1308 may generally be performed in the same manner as 708 above. Note that all of the embodiments related to making decisions regarding configurations and further information also apply to 1308.

More details on one embodiment for the determination of whether to allow the requested transmission or reception is provided with respect to FIGS. 14A-16 below.

FIGS. 14A-16—Arbitration Using Scheduling Information

FIGS. 14A-16 illustrate embodiments of arbitration using scheduling information of one of the wireless protocols according to the method of FIG. 13. Similar to above, the following section is described with respect to Bluetooth and WLAN, but may be modified to be any two wireless protocols (e.g., including the inverse where WLAN is replaced with Bluetooth).

As indicated above, when BT event schedule is available to the coexistence engine, WLAN can make a decision based on the next BT event scheduled. This information together with current BT status may be used for scheduling WLAN events.

Figure 14A:
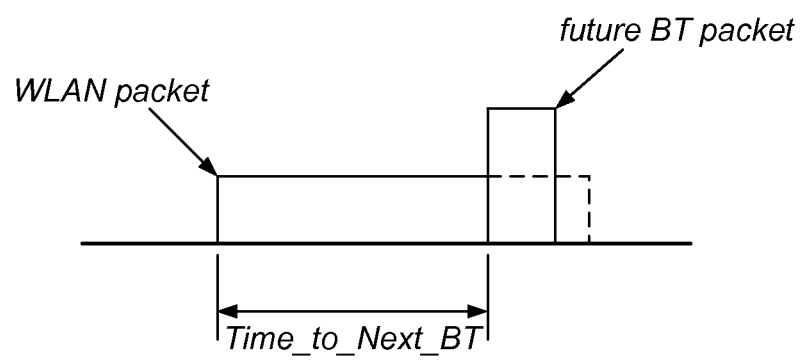

The time_to_next_BT parameter is the difference between current time and first scheduled BT event. When future BT activity has high priority, WLAN can still start transmit when If time_to_next_BT>threshold. This threshold relationship is shown in FIG. 14A. More particularly, in FIG. 14A, the future BT packet is expected in less than the threshold amount, so there is a predicted conflict.

FIG. 15 is a table illustrating one embodiment of arbitration using scheduled BT activity. In most cases, if WLAN does not have priority and the time to next BT is greater than the threshold, the WLAN can receive or transmit, although other cases are also shown in the table. Similar to above, this table includes switch positions, which may apply to the embodiments of FIGS. 17-20.

Figure 16:
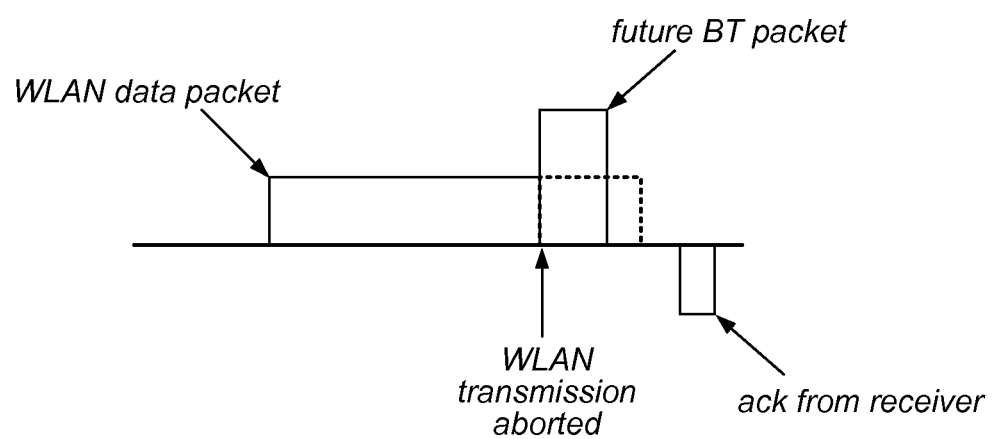

FIG. 16 illustrates the case where, after a WLAN aborted transmission, WLAN transmitter may still wait for Block Ack since part of the subframes may have been received correctly by the intended receiver.

Figure 14B:
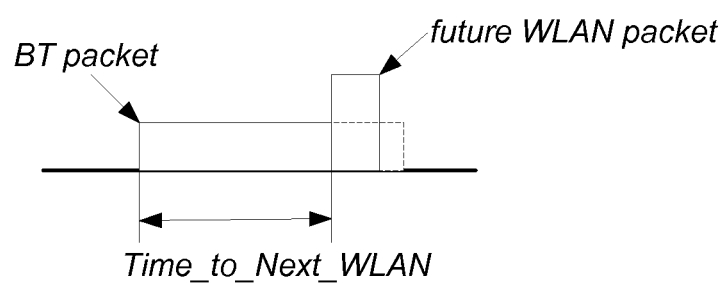

Similar embodiments apply to FIG. 14B with respect to BT reception or transmission with a scheduled upcoming WLAN packet. As shown in this Figure, the future WLAN packet is expected in less than the threshold time, so there is a predicted conflict.

Note that various embodiment described above relating to scheduled transmissions may also apply to predicted transmissions or receptions (e.g., based on prior history). Thus, even if future transmissions or receptions are not scheduled, they may be predicted, and those predictions may be used similar to scheduled transmission or receptions as described in embodiments above.

Figure 17:
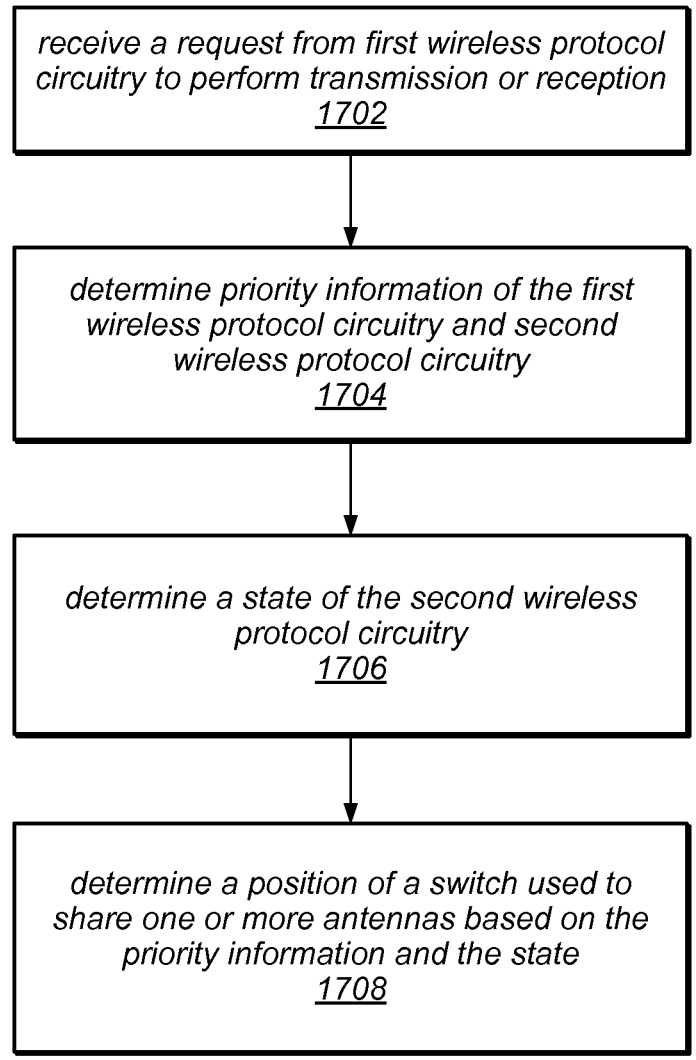
FIG. 17 is a flowchart diagram illustrating one embodiment of a method for determining switch positions for an antenna used by a first wireless protocol and a second wireless protocol.

FIG. 17—Switch Position Selection for Two Wireless Protocols Sharing an Antenna

FIG. 17 is a flowchart diagram illustrating one embodiment of a method for selecting a switch position for an antenna for performing transmission or reception. The method may be implemented in a system supporting multiple wireless protocols for use in a wireless device, such as any of the systems shown in the various figures and described with respect thereto. In some embodiments (such as might be implemented in the systems shown above and described above with respect thereto), the wireless protocols may be WLAN and Bluetooth (BT). The wireless protocols may alternatively be other wireless protocols, if desired. The method elements may be modified, performed in a different order, removed, etc., as desired.

In 1702, a request to perform a transmission or reception may be received from the first wireless protocol circuitry, similar to 702 above.

In 1704, priority information of the first wireless protocol circuitry and the second wireless protocol circuitry may be determined, similar to 704 and/or 1306 above. In other words, the priority information of the second wireless protocol may be current or future priority information, as desired.

In 1706, a state of the second wireless protocol circuitry may be determined, similar to 706 and/or 1306 above. In other words, the state of the second wireless protocol circuitry may be current or future state information, as desired.

In 1708, a position of a switch used to share one or more antennas may be determined based on the priority information and the state. More particularly, in one embodiment, the method of FIG. 17 may particular apply to the embodiments of 5C and 5E. However, they may also apply to other embodiments that involve antenna sharing via a switch (e.g., where there is only one chain for one of the wireless protocols, or multiple chains, as desired). In one embodiment, the switch may be a SPDT switch, although other switches are envisioned.

The position of the switch may be based on the priority information and/or the state information, or alternatively, may be based on the outcome of the decision on the requested transmission or reception. In one embodiment a table may be used to determine a desired switch position of the switch for performing the requested transmission or reception. The table may be based on current configuration information, such as whether various gain element(s) are shared between the first and second wireless protocol circuitries. In general, the desired switch position may be used depending on the priority information, state information, and/or further information. However, the desired switch position may be used only if the first wireless protocol circuitry has priority. Similarly, the current switch position may be overridden based on the priority information, state information, and/or further information. One embodiment of the logic flow of this decision as well as the table is provided below regarding FIGS. 17-20.

Additionally, it should be noted that the first wireless protocol circuitry and the second wireless protocol circuitry may have a shared pathway other than the antenna shared via the switch (e.g., by sharing a gain element). Accordingly, the first wireless protocol circuitry may be able to perform the requested transmission or reception even when the switch position is not changed to the ideal position for the requested transmission or reception. Thus, the first wireless protocol circuitry may be configured to perform the requested transmission or reception using the shared pathway even when the antenna position is not changed.

In one embodiment, the position of the switch may follow from either of the methods of FIGS. 7 and 13. The method of FIG. 17 may be performed by the coexistence circuitry or by other circuitry as desired. The circuitry may be part of the first and/or second wireless protocol circuitry, the coexistence circuitry, and/or separate from either or both, as desired.

Figure 18:
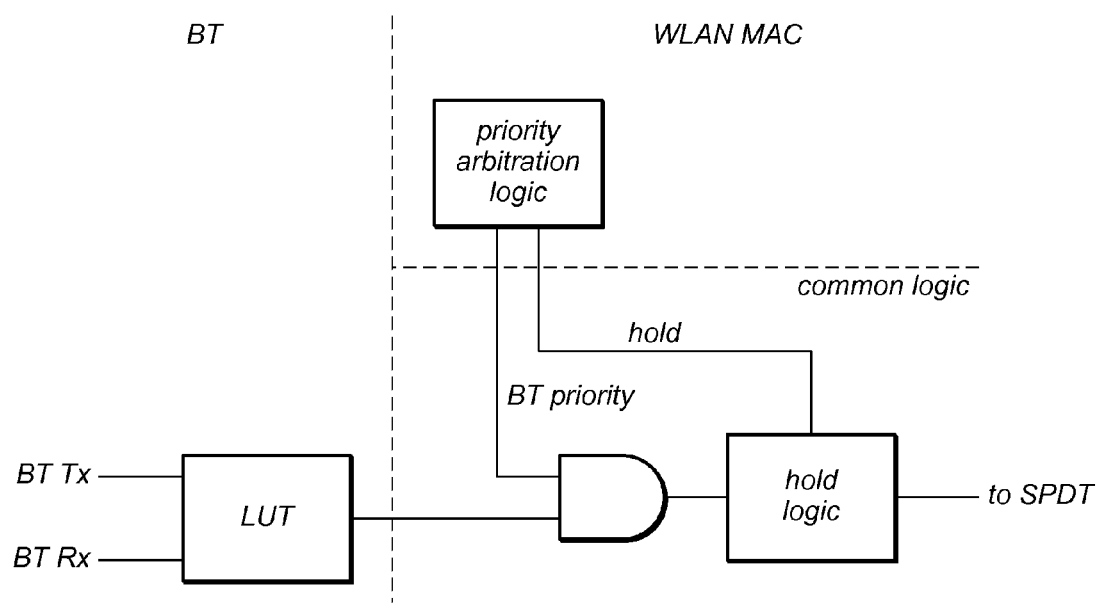
Figure 20:
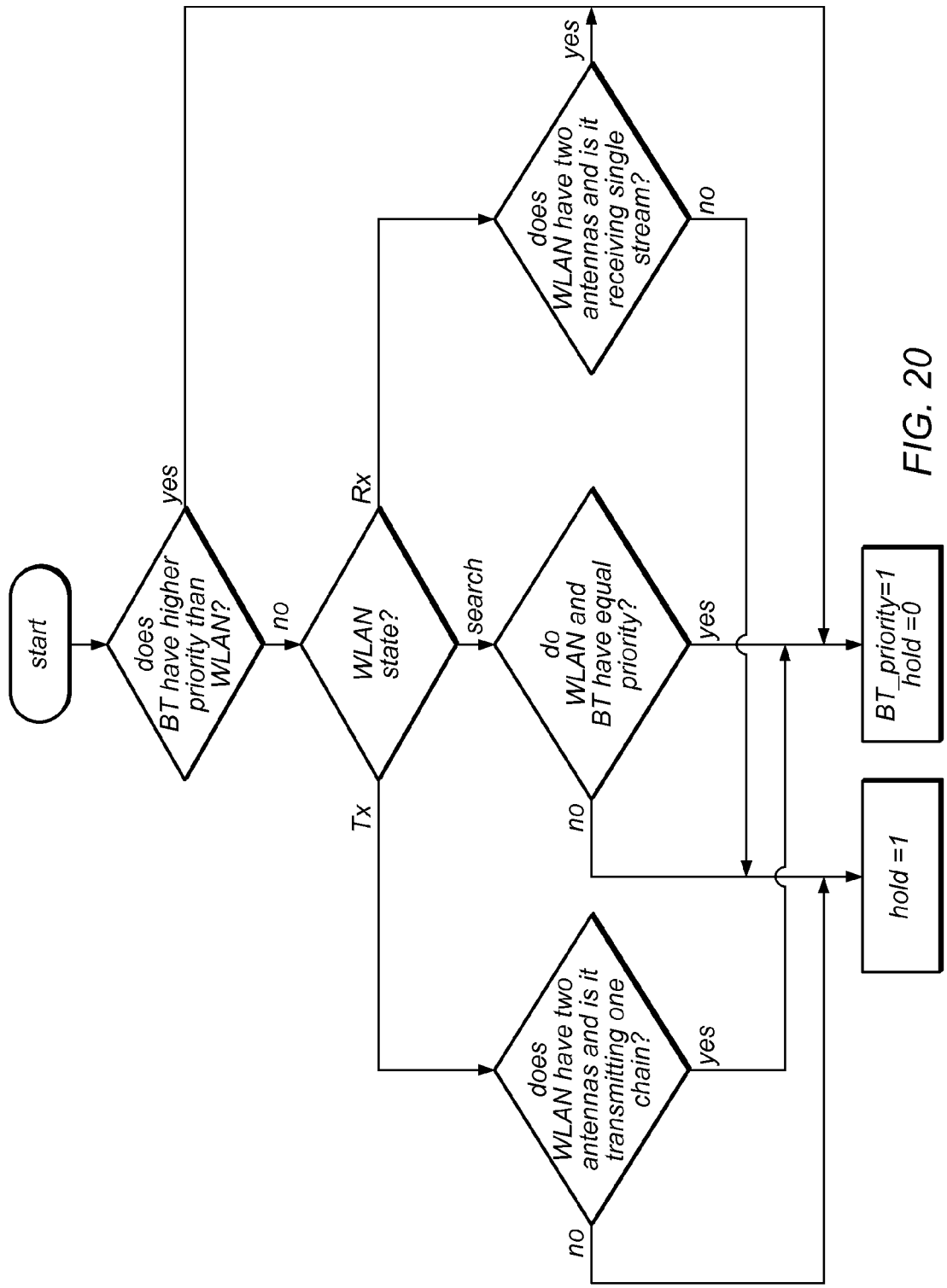

FIGS. 18-20—Switch Selection According to the Method of FIG. 17

FIGS. 18-20 describe embodiments of switch selection according to the method of FIG. 17. Similar to above, the following section is described with respect to Bluetooth and WLAN, but may be modified to be any two wireless protocols (e.g., including the inverse where WLAN is replaced with Bluetooth). Additionally, note that various tables described above also include the position of an exemplary switch, and may thus apply to these embodiments.

As shown and described in the various configurations above, a WLAN and BT combo chip may have a switch (e.g., an external SPDT (Single Pole, Double Throw) switch) for one-antenna configurations and/or two-antenna configurations, e.g., for the sake of limited space or cost reduction.

FIG. 18 illustrates one embodiment of switch control logic for controlling an SPDT switch. As shown in this Figure, the SPDT control logic may include of the following components:

The priority arbitration logic may determine whether the switch will be for BT, WLAN, or No-change;

A look-up-table (LUT) (shown in FIG. 19) may be used to find the preferred switch position for BT-Tx and BT_Rx: If PA is shared, btTxSwitchPos=WLAN; Else btTxSwitchPos=BT; If LNA is shared, btRxSwitchPos=WLAN; and Else btRxSwitchPos=BT.

An AND logic may take inputs from the BT Priority signal and the outcome of the LUT; and Hold logic may be used to hold the switch position when the Hold signal is asserted.

The following provides one embodiment of the algorithm for the switch arbitration logic:

When WLAN is asleep/inactive: BT_priority=1 and Hold=0;

When WLAN is awake:

At the pos edge of BT Tx, BT_priority=1 and Hold=0;

At the pos edge of WLAN Tx, if WLAN is going to use the shared chain for this transmission, BT_priority=0 and Hold=0;

At the pos edge of BT Rx: a) if BT has high priority, BT_priority=1 and Hold=0; b) else if WLAN has two antennas and is transmitting one chain, BT_priority=1 and Hold=0; c) else if WLAN has two antennas and is receiving single stream, BT_priority=1 and Hold=0; d) else if WLAN is in search state and has equal priority with BT, BT_priority=1 and Hold=0; and e) else, Hold=1.

At the pos edge of WLAN Rx, Hold=1;

At the neg edge of BT Tx/Rx, if WLAN is not in active Rx, BT_priority=0 and Hold=0; and At the neg edge of WLAN Tx/Rx, if BT is not in active Tx/Rx, BT_priority=0 and Hold=0;

FIG. 20 is a flowchart diagram illustrating the algorithm described above at the positive edge of a BT reception.

Figure 21:
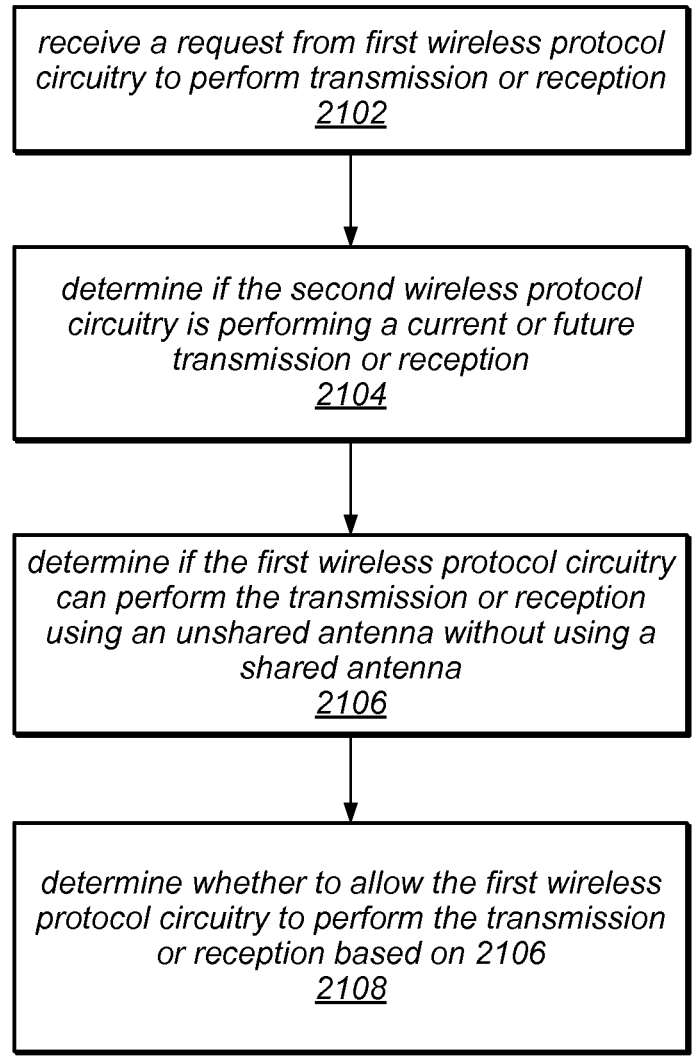
FIGS. 21 and 22 are flowchart diagrams illustrating arbitration and chain selection when using two wireless protocols.

FIG. 21—Shared or Unshared Antenna Selection for Transmission or Reception

FIG. 21 illustrates an embodiment of selection of antennas (e.g., shared or unshared) for transmission or reception by one of the wireless protocols. This method may be particularly applicable to requested WLAN transmissions. The method may be implemented in a system supporting multiple wireless protocols for use in a wireless device, such as any of the systems shown in the various figures and described with respect thereto. In some embodiments (such as might be implemented in the systems shown above and described above with respect thereto), the wireless protocols may be WLAN and Bluetooth (BT). The wireless protocols may alternatively be other wireless protocols, if desired. The method elements may be modified, performed in a different order, removed, etc., as desired.

In 2102, a request to perform transmission or reception may be received from the first wireless protocol circuitry similar to 702 above.

In 2104, the method (e.g., coexistence logic or other logic) may determine if the second wireless protocol circuitry is or will perform a current or future transmission or reception, similar to 706 and 708 or 1304. Thus, the method may determine if there is a current conflict or future conflict with the requested transmission or reception with respect to the second wireless protocol circuitry.

In 2106, the method (e.g., coexistence logic or other logic) may determine if the first wireless protocol circuitry is able to perform the current or future transmission or reception using one or more unshared antennas without using one or more shared antennas. More particularly, the first wireless protocol circuitry and the second wireless protocol circuitry may share the one or more shared antennas, but the first wireless protocol circuitry may have access to one or more antennas that are not shared. Thus, the first wireless protocol circuitry may be configured to use shared and/or unshared antennas, depending on a transmission or reception mode. In some embodiments, the determination may be based on whether a required number of chains for the requested transmission or reception is greater than the number of available unshared chains. If this is the case, the determination may be further based on whether the requested transmission or reception could be performed with a lesser number of streams (until it is less than or equal to the number of unshared antenna(s)).

Note that 2106 may be performed if either the second wireless protocol circuitry is performing a transmission or reception or if the requested transmission or reception will conflict with the future transmission or reception of the second wireless protocol circuitry. Specific embodiments of this determination are provided below.

In 2108, the method may determine whether to allow the first wireless protocol circuitry to perform the requested transmission or reception based on 2106. For example, if there is a current or future conflict with the second wireless protocol circuitry and if the method determines that the requested transmission or reception can be performed using only unshared chains, then the first wireless protocol circuitry may be permitted to perform the requested transmission or reception using only the unshared chains. If there is not a conflict, then the first wireless protocol may also be permitted to perform the requested transmission or reception.

Additionally, similar to embodiments above, the determination of 2108 may also be based on priority information of the wireless protocol circuitry, current or future priority information of the second wireless protocol circuitry, a current or future state of the second wireless protocol circuitry, and/or further information, such as configuration information. For example, where the first wireless protocol is not able to only use unshared chains, the determination may be similar to that described in 708 and/or 1308, depending on the case of the conflict.

Note that while the above method assumes a request from the first wireless protocol circuitry and the determination of whether unshared antennas (or chains) is performed with respect to the first wireless protocol circuitry, the method may be inverted such that the request is received from the first wireless protocol circuitry, and the determination may be whether the second wireless protocol can perform a current or future transmission or reception using unshared antennas rather than shared antennas. Thus, instead of changing the method of the transmission or reception of the first wireless protocol circuitry, the method of transmission or reception of the second wireless protocol circuitry may be changed. Additionally, in this embodiment, the second wireless protocol circuitry is capable of using unshared antennas to perform a transmission or reception.

Figure 22:
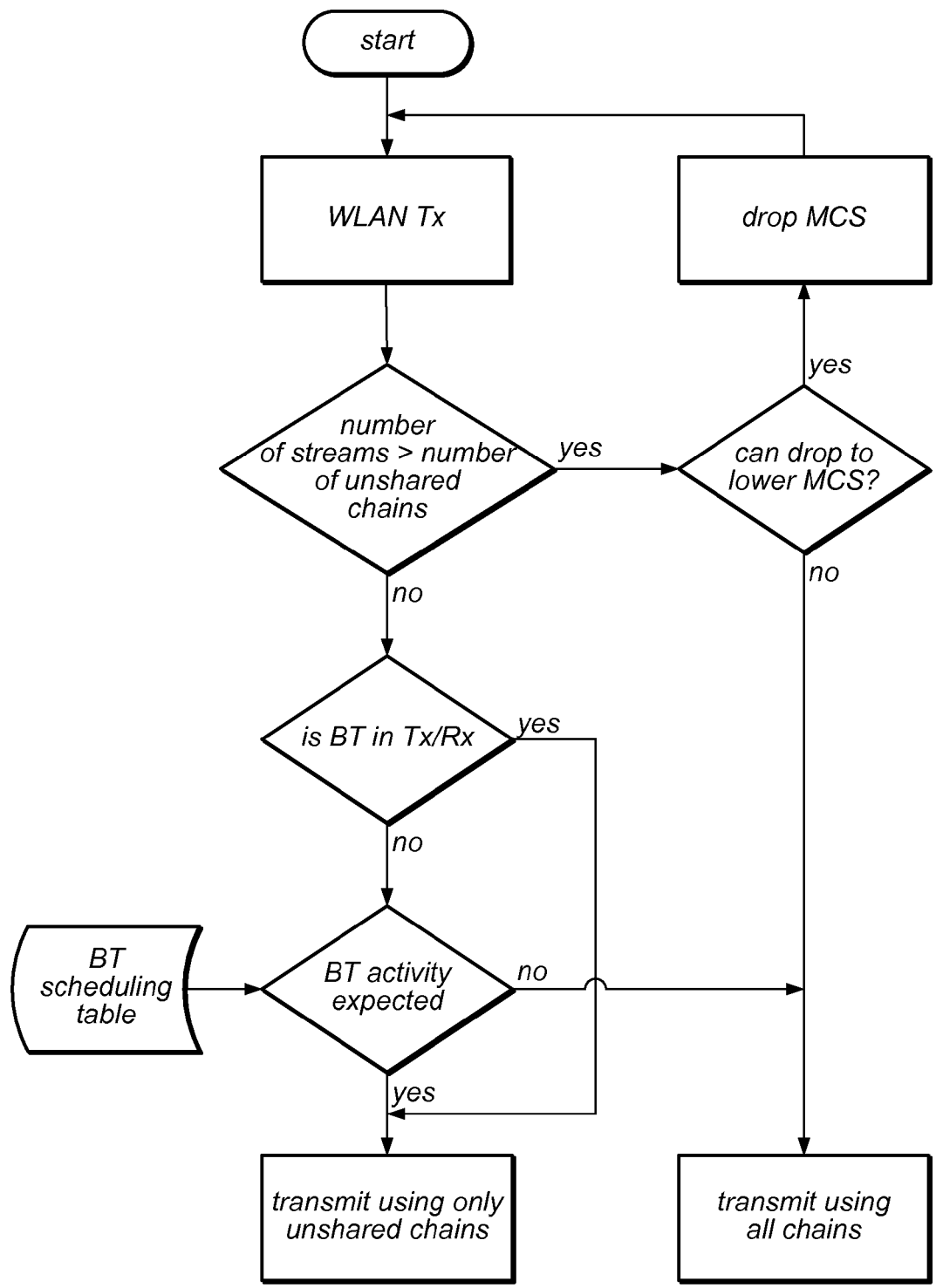

FIG. 22—Chain Selection According to the Method of FIG. 21

The following provides details on one embodiment of the method of FIG. 21 and is not meant to limit the scope of the corresponding embodiments. For example, while the below only discusses WLAN transmission, further protocols and embodiments are envisioned. As used herein, the term "chain" may generally refer to a transmission or reception pathway. A shared or unshared chain may simply refer to a shared or unshared antenna (as in the method of FIG. 21), or may refer to more of the transmission or reception pathway (e.g., including a shared gain element and corresponding pathway).

In combo BT+WLAN chips with shared chain configuration(s), sometimes it is possible to use only unshared chain(s) for transmission. For example, it may be possible if data is transmitted using an MCS rate where number of streams is smaller than number of unshared chains or antennas (e.g., for single-stream MCS rates). Transmitting using only unshared chain(s) has the following advantages:

If BT is in receive or an Rx event is expected, by not using shared chain for WLAN transmission, the interference to the received (or expected) BT packet from WLAN transmission may be minimized. This benefit increases with increasing isolation between the shared chain and unshared chain(s).

If BT is currently transmitting or a Tx event is expected, no transmit power backup may be needed in the WLAN side as BT and WLAN signals may be transmitted from different antennas.

Single chain transmission may only be possible for single stream packets. In MIMO systems, the number of antennas (or chains) may be larger than number of transmit streams. Deciding on whether to use shared chain or not can be done depending on the queued transmit packets, current BT state, and expected BT behavior. For MCS rates that dos not require a shared chain to be used (such as an ACK), transmission using only unshared chains can be employed if BT is currently active or a BT event it expected using the BT scheduling table. For higher MCS rates, which require a shared chain as well, WLAN may be able drop to lower stream rate to transmit on the unshared chain(s), e.g., in the case of equal priority. In this case, the rate adaptation algorithm may be automatically adapted to favor MCS rates which can be transmitted using only unshared chain(s) when BT is active.

FIG. 22 illustrates one embodiment of chain selection. More particularly, as shown, during or prior to WLAN Tx, the number of streams may be compared to the number of unshared chains. If the number of streams are greater, it may be determined if a lower MCS may be used. If so, the MCS may be lowered. If not, the transmit may occur using all chains (which may result in a conflict with a current or future BT transmission or reception, which may be handled as described above). However, if the number of streams are not greater, and BT is in Tx or Rx, transmission may occur only using unshared chains, thus allowing the BT activity to occur without delay, e.g., concurrently. If BT is not in Tx or Rx, it may be determined if BT activity is expected (e.g., using a BT scheduling table). If so, transmission may occur using only unshared chains, thus allowing the future BT activity to occur without delay, e.g., concurrently. If not, transmission may occur using all chains, e.g., after reaching a decision, as described in FIGS. 7 and 13.

Note that various embodiment described above relating to scheduled transmissions may also apply to predicted transmissions or receptions (e.g., based on prior history). Thus, even if future transmissions or receptions are not scheduled, they may be predicted, and those predictions may be used similar to scheduled transmission or receptions as described in embodiments above.

Figure 23:
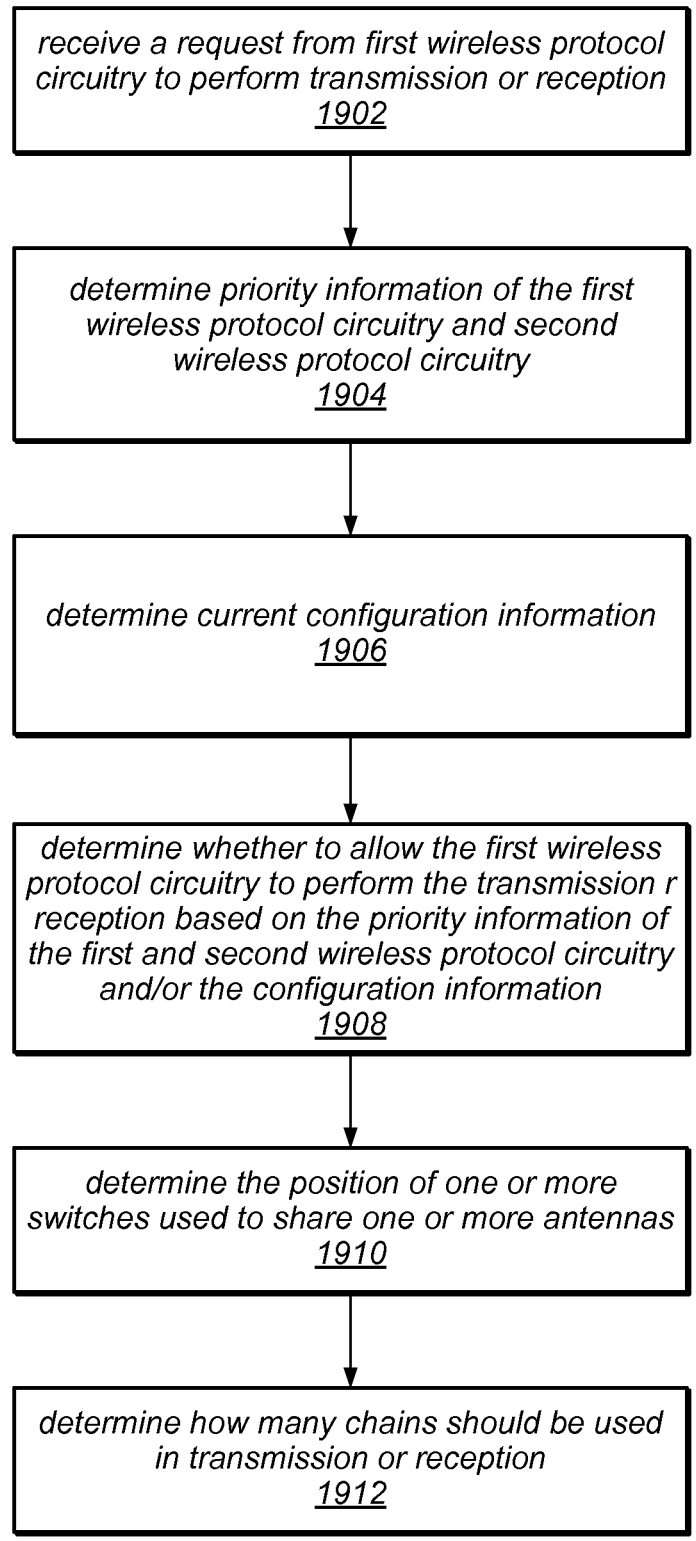
FIG. 23 is a flowchart diagram illustrating one embodiment of a method for arbitrating between two wireless protocols.

FIG. 23—Exemplary Method for Arbitration

FIG. 23 is a flowchart diagram illustrating one embodiment of a method for arbitrating between two wireless protocols. The method may be implemented in a system supporting multiple wireless protocols for use in a wireless device, such as any of the systems shown in the various figures and described with respect thereto. In some embodiments (such as might be implemented in the systems shown above and described above with respect thereto), the wireless protocols may be WLAN and Bluetooth (BT). The wireless protocols may alternatively be other wireless protocols, if desired. The method elements may be modified, performed in a different order, removed, etc., as desired.

In 2302, a request may be received from first wireless protocol circuitry to perform transmission or reception. The request may be received by arbitration or coexistence circuitry.

In 2304, priority information of the first wireless protocol circuitry and the second wireless protocol circuitry may be determined.

In 2306, current configuration information may be determined. The current configuration information may be, for example, the number of antennas that are in use, the position of the switch(es) (if a switch is used), etc.

In 2308, the method may determine whether to allow the first wireless protocol circuitry to perform transmission or reception based on the priority information of the first wireless protocol circuitry, the priority information of the second wireless protocol circuitry, and/or current configuration information.

More particularly, 2308 may be performed according to any of the embodiments described above.

Additionally, in 2310, the method may determine the position of one or more switches used to share one or more antennas, similar to embodiments described above.

Additionally, in 2312, the method may determine how many chains should be used in transmission or reception, similar to embodiments described above.

Some or all of 2302-2312 may be performed by arbitration logic or coexistence circuitry of the wireless device.

Although the embodiments above have been described in considerable detail, numerous variations and modifications will become apparent to those skilled in the art once the above disclosure is fully appreciated. For example, while most embodiments are described with regard to circuitry, they may be implemented via any appropriate means, including integrated circuits, programmable hardware elements, memories and processors, etc. It is intended that the following claims be interpreted to embrace all such variations and modifications.

What is claimed is:

1. A system for use in a wireless device, the system comprising:
   first wireless protocol circuitry, wherein the first wireless protocol circuitry is configured to receive, transmit, and process first signals according to a first wireless protocol, wherein the first wireless protocol circuitry is configured to generate a request to perform a transmission or reception;
   second wireless protocol circuitry, wherein the second wireless protocol circuitry is configured to receive, transmit, and process second signals according to a second wireless protocol, wherein the second wireless protocol circuitry is configured to generate a request to perform a transmission or reception;
   wherein the first wireless protocol circuitry and the second wireless protocol circuitry are configured to share at least one first antenna, wherein the first wireless protocol circuitry is configured to use at least one second antenna that is not shared with the second wireless protocol circuitry;
   coexistence circuitry configured to:
   receive a request from the first wireless protocol circuitry to perform transmission or reception;
   determine if the second wireless protocol circuitry is performing a transmission or reception;
   determine if the first wireless protocol circuitry is able to perform the transmission or reception using the at least one second antenna without using the at least one first antenna;

determine whether to allow the first wireless protocol circuitry to perform transmission or reception based on the determination of whether if the first wireless protocol circuitry is able to perform transmission or reception using the at least one second antenna without using the at least one first antenna; and determine whether the requested transmission or reception from the first wireless protocol circuitry will conflict with a future transmission or reception of the second wireless protocol circuitry;

wherein said determining if the first wireless protocol circuitry is able to perform the transmission or reception using the at least one second antenna without using the at least one first antenna is performed if either the second wireless protocol circuitry is performing a transmission or reception or if the requested transmission or reception will conflict with the future transmission or reception of the second wireless protocol circuitry.

2. The system of claim 1, wherein said determining whether the requested transmission or reception from the first wireless protocol circuitry will conflict with a future transmission or reception of the second wireless protocol circuitry is based on a scheduling table of the second wireless protocol circuitry.

3. The system of claim 2, wherein the second wireless protocol circuitry is Bluetooth, wherein the scheduling table comprises future Bluetooth transmissions or receptions.

4. The system of claim 1, wherein the first wireless protocol is WLAN, and wherein the request is to perform a WLAN transmission.

5. The system of claim 1, wherein said determining whether to allow the first wireless protocol circuitry to perform the transmission or reception is also based on priority information of first wireless protocol circuitry and the second wireless protocol circuitry.

6. The system of claim 1, further comprising:
a gain element configured to receive the first and second signals, wherein the gain element is adjustable to amplify the received first and second signals by an adjustable amount, wherein the gain element is shared by the first wireless protocol circuitry and the second wireless protocol circuitry.

7. A system for use in a wireless device, the system comprising:
first wireless protocol circuitry, wherein the first wireless protocol circuitry is configured to receive, transmit, and process first signals according to a first wireless protocol, wherein the first wireless protocol circuitry is configured to generate a request to perform a transmission or reception;
second wireless protocol circuitry, wherein the second wireless protocol circuitry is configured to receive, transmit, and process second signals according to a second wireless protocol, wherein the second wireless protocol circuitry is configured to generate a request to perform a transmission or reception;
wherein the first wireless protocol circuitry and the second wireless protocol circuitry is configured to share at least one first antenna, wherein the second wireless protocol circuitry is configured to use at least one second antenna that is not shared with the first wireless protocol circuitry;
coexistence circuitry coupled to the first wireless protocol circuitry and the second wireless protocol circuitry, wherein the coexistence circuitry is configured to receive transmit/receive requests from the first wireless protocol circuitry and/or the second wireless protocol circuitry;

wherein the coexistence circuitry is configured to:
receive a request from the first wireless protocol circuitry to perform transmission or reception;
determine if the second wireless protocol circuitry is able to perform transmission or reception using the at least one second antenna without using the at least one first antenna;
determine whether to allow the first wireless protocol circuitry to perform transmission or reception based on the determination of whether the second wireless;
determine whether the requested transmission or reception from the first wireless protocol circuitry will conflict with a future transmission or reception of the second wireless protocol circuitry; and
wherein said determining if the first wireless protocol circuitry is able to perform the transmission or reception using the at least one second antenna without using the at least one first antenna is performed if either the second wireless protocol circuitry is performing a transmission or reception or if the requested transmission or reception will conflict with the future transmission or reception of the second wireless protocol circuitry.

8. The system of claim 7, wherein the transmission or reception by the second wireless protocol circuitry is a future transmission or reception.

9. The system of claim 7, wherein said determining whether to allow the first wireless protocol circuitry to perform the transmission or reception is also based on priority information of first wireless protocol circuitry and the second wireless protocol circuitry.

10. A method for determining a mode for transmission or reception within a wireless device, comprising:
receiving a request from first wireless protocol circuitry to perform transmission or reception, wherein the first wireless protocol circuitry is configured to receive, transmit, and process first signals according to a first wireless protocol;
determining if second wireless protocol circuitry is performing a transmission or reception, wherein the second wireless protocol circuitry is configured to receive, transmit, and process second signals according to a second wireless protocol, wherein the first wireless protocol circuitry and the second wireless protocol circuitry is configured to share at least one first antenna, wherein the first wireless protocol circuitry is configured to use at least one second antenna that is not shared with the second wireless protocol circuitry;
determining if the first wireless protocol circuitry is able to perform the transmission or reception using the at least one second antenna without using the at least one first antenna;
determining whether to allow the first wireless protocol circuitry to perform transmission or reception based on the determination of whether the first wireless protocol circuitry is able to perform transmission or reception using the at least one second antenna without using the at least one first antenna; and
determine whether the requested transmission or reception from the first wireless protocol circuitry will conflict with a future transmission or reception of the second wireless protocol circuitry;
wherein said determining if the first wireless protocol circuitry is able to perform the transmission or reception using the at least one second antenna without using the at least one first antenna is performed if either the second wireless protocol circuitry is performing a transmission or reception or if the requested transmission or reception will conflict with the future transmission or reception of the second wireless protocol circuitry.

11. The method of claim 10, wherein said determining whether the requested transmission or reception from the first wireless protocol circuitry will conflict with a future transmission or reception of the second wireless protocol circuitry is based on a scheduling table of the second wireless protocol circuitry.

12. The method of claim 11, wherein the second wireless protocol circuitry is Bluetooth, wherein the scheduling table comprises future Bluetooth transmissions or receptions.

13. The method of claim 10, wherein the first wireless protocol is WLAN, and wherein the request is to perform a WLAN transmission.

14. The method of claim 10, wherein said determining whether to allow the first wireless protocol circuitry to perform the transmission or reception is also based on priority information of first wireless protocol circuitry and the second wireless protocol circuitry.

15. A method for determining a mode for transmission or reception within a wireless device, comprising:
receiving a request from first wireless protocol circuitry to perform transmission or reception, wherein the first wireless protocol circuitry is configured to receive, transmit, and process first signals according to a first wireless protocol;
determining if second wireless protocol circuitry is able to perform a transmission or reception using the at least one second antenna without using the at least one first antenna, wherein the second wireless protocol circuitry is configured to receive, transmit, and process second signals according to a second wireless protocol, wherein the first wireless protocol circuitry and the second wireless protocol circuitry is configured to share at least one first antenna, wherein the second wireless protocol circuitry is configured to use at least one second antenna that is not shared with the first wireless protocol circuitry;
determining if the second wireless protocol circuitry is able to perform transmission or reception using the at least one second antenna without using the at least one first antenna;
determining whether to allow the first wireless protocol circuitry to perform transmission or reception based on the determination of whether the second wireless protocol circuitry is able to perform transmission or reception using the at least one second antenna without using the at least one first antenna;
determine whether the requested transmission or reception from the first wireless protocol circuitry will conflict with a future transmission or reception of the second wireless protocol circuitry;
wherein said determining if the first wireless protocol circuitry is able to perform the transmission or reception using the at least one second antenna without using the at least one first antenna is performed if either the second wireless protocol circuitry is performing a transmission or reception or if the requested transmission or reception will conflict with the future transmission or reception of the second wireless protocol circuitry.

16. The method of claim 15, wherein the transmission or reception by the second wireless protocol circuitry is a future transmission or reception.

17. The method of claim 15, wherein the transmission or reception by the second wireless protocol circuitry is a current transmission or reception.

18. The method of claim 15, wherein said determining whether to allow the first wireless protocol circuitry to perform the transmission or reception is also based on priority information of first wireless protocol circuitry and the second wireless protocol circuitry.

\* \* \* \* \*